(12) United States Patent
Coffey et al.

(10) Patent No.: US 7,440,262 B2
(45) Date of Patent: Oct. 21, 2008

(54) MODULAR POWER DISTRIBUTION SYSTEM AND METHODS

(75) Inventors: Joseph Coffey, Burnsville, MN (US); David Johnsen, Plymouth, MN (US); Duane Sand, Annandale, MN (US); Bradley Blichfeldt, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 3 days.

(21) Appl. No.: 11/710,851

(22) Filed: Feb. 26, 2007

(65) Prior Publication Data

US 2008/0136259 A1 Jun. 12, 2008

Related U.S. Application Data

(60) Provisional application No. 60/873,620, filed on Dec. 6, 2006.

(51) Int. Cl.
*H02B 1/01* (2006.01)
*H05K 7/00* (2006.01)
*H05K 1/14* (2006.01)

(52) U.S. Cl. ............ 361/627; 361/728; 361/729; 361/730; 361/796

(58) Field of Classification Search .............. None
See application file for complete search history.

(56) References Cited

U.S. PATENT DOCUMENTS

| | | | |
|---|---|---|---|
| 3,590,325 A | 6/1971 | McMillen et al. | |
| 5,204,800 A | 4/1993 | Wasney | |
| 5,699,241 A * | 12/1997 | Fujikawa | 363/144 |
| 6,038,126 A | 3/2000 | Weng | |
| 6,067,023 A | 5/2000 | Bendikas | |
| 6,075,698 A * | 6/2000 | Hogan et al. | 361/695 |
| 6,160,699 A | 12/2000 | Gibson et al. | |
| 6,331,933 B1 | 12/2001 | Rumney | |
| 6,421,215 B1 | 7/2002 | Bushue | |
| 6,456,203 B1 | 9/2002 | Schomaker et al. | |
| 6,496,376 B1 * | 12/2002 | Plunkett et al. | 361/729 |
| 6,653,802 B1 * | 11/2003 | Nelson et al. | 315/291 |
| 6,707,256 B2 * | 3/2004 | Brunker et al. | 315/112 |
| 6,719,149 B2 | 4/2004 | Tomino | |
| 6,819,567 B2 * | 11/2004 | Baker et al. | 361/724 |
| 6,873,510 B2 | 3/2005 | Schomaker et al. | |
| 7,005,996 B2 | 2/2006 | Cabrera et al. | |

(Continued)

FOREIGN PATENT DOCUMENTS

CH 300420 10/1954

(Continued)

OTHER PUBLICATIONS

U.S. Appl. No. 11/654,367, filed Jan. 17, 2007.

(Continued)

*Primary Examiner*—Boris L Chervinsky
(74) *Attorney, Agent, or Firm*—Merchant & Gould P.C.

(57) ABSTRACT

A modular power distribution system comprises a chassis and a backplane including a power input, and a plurality of module connection locations. A plurality of modules are mounted in the chassis, each module mounted to one of the module connection locations. Each module includes: (i) a circuit protection device; and (ii) a power output connection location. Bus bars connect front power inputs to the backplane.

15 Claims, 41 Drawing Sheets

U.S. PATENT DOCUMENTS

| | | | |
|---|---|---|---|
| 7,126,803 B2 | 10/2006 | Schomaker et al. | |
| 7,190,093 B2 * | 3/2007 | Bet et al. | 307/147 |
| 2002/0020682 A1 | 2/2002 | Broome | |
| 2004/0113804 A1 | 6/2004 | Cabrera et al. | |
| 2007/0183130 A1 * | 8/2007 | Yamabuchi et al. | 361/728 |
| 2007/0258219 A1 * | 11/2007 | Howes et al. | 361/728 |

FOREIGN PATENT DOCUMENTS

| | | |
|---|---|---|
| DE | 36 28 130 C1 | 11/1987 |
| GB | 2 018 031 A | 10/1979 |
| WO | WO 01/72098 A2 | 9/2001 |
| WO | WO 01/76030 A2 | 10/2001 |

OTHER PUBLICATIONS

Hendry Telephone Products document, 2 pages, entitled "Power Distribution, Flexible Series," dated Feb. 1998, pp. 6 and 7.

Hendry Telphone Products document, 2 pages, entitled "Power Distribution, High Density," dated Feb. 1998, pp. 9 and 10.

Hendry Telephone Products document, 2 pages, entitled "Power Distribution, Intelligent," dated Feb. 1998, pp. 17 and 18.

Hendry Telephone Products document, 2 pages, entitled "Power Distribution, Traditional," dated Feb. 1998, pp. 23 and 24.

Telect.com catalog page entitled "Uninterrupted Battery Fuse Panel,", copyright 1999, p. 7.

Telect.com catalog page entitled "Intermediate Fuse Panels," copyright 1999, p. 8.

Telect.com catalog, 2 pages entitled "Circuit Breaker Panel," copyright 1999, pp. 9 and 10.

Telect.com catalog, 2 pages entitled "High Current Circuit Breaker Panel," copyright 1999, pp. 11 and 12.

Telect.com brochure, 2 pages, entitled "Two Fuse Panels in One Rack Space—Intermediate Fuse Panel," dated Jul. 1998.

Printouts from www.telect.com dated Mar. 22, 2000, entitled "Telect, Fuse Panels", 2 pages.

Printouts from www.telect.com dated Mar. 22, 2000, entitled "Telect's Traditional Fuse Panels," 3 pages.

Printouts from www.telect.com dated Mar. 22, 2000, entitled "Telect's Total Front Access Fuse Panels," 2 pages.

Printouts from www.telect.com dated Mar. 22, 2000, entitled "Telect's Intermediate Fuse Panels," 2 pages.

Printouts from www.telect.com dated Mar. 22, 2000, entitled "Telect, Configurable Circuit Breaker Panel," 2 pages.

Printouts from www.telect.com dated Mar. 22, 2000, entitled "Telect's Circuit Breaker Panel," 2 pages.

Printouts from www.telect.com dated Mar. 30, 2000, entitled "Telect's Uninterrupted Battery Fuse Panel," 4 pages.

ADC Telecommunications, Inc., PowerWorx™ Power Distribution Products brochure, dated Aug. 2000.

Drawings from Cisco Systems, Inc. for Stagecoach PDU power distribution panel product, 37 sheets (admitted as prior art as of Jan. 17, 2007).

Hendry Telephone Products power distribution product information pp. 4-9, 12-35, and 38 to 43 (admitted as prior art).

* cited by examiner

MODULAR POWER DISTRIBUTION SYSTEM AND METHODS

CROSS REFERENCE TO RELATED APPLICATIONS

This application is a non-provisional application claiming priority to provisional application Ser. No. 60/873,620, filed Dec. 6, 2006, entitled "Modular Power Distribution Systems and Methods", the disclosure of which is incorporated by reference.

FIELD OF THE INVENTION

The present invention relates to a power distribution panel with circuit element modules.

BACKGROUND OF THE INVENTION

Electrical circuit panels such as power distribution panels typically include a number of different circuit elements such as fuse holders and fuses, circuit breakers, input and output connectors and alarm signal LED's. For safety and other reasons, the electrical circuits of power distribution panels are enclosed within a housing structure. Therefore, the circuit elements listed above have typically been inserted into holes that have been pre-cut or pre-punched into the housing structure, usually on a front or back panel of the housing structure.

These prior circuit panels are fixed and once the holes are formed in the housing, the type and arrangement of the components is limited. In order to manufacture different fixed circuit panels of the prior systems, a circuit panel manufacturer would punch out different patterns of holes in the front or back panels of the housing structure in order to accommodate different arrangements of circuit elements. Significant retooling time and costs are involved for offering different fixed panels. Assembly of the circuit elements is also difficult when the elements are inserted through holes. One solution is described and shown in U.S. Pat. No. 6,456,203.

In addition, such panels are hardwired between the input and output connections, and the fuse and/or breaker locations. In some panels, redundant power connections are provided, controlled by an OR-ing diode including a heat sink. These features can take up significant space within the panel.

There is a continued need for improved power distribution panels.

SUMMARY OF THE INVENTION

A modular power distribution system comprises a chassis and a backplane including a power input, and a plurality of module connection locations. A plurality of modules are mounted in the chassis, each module mounted to one of the module connection locations. Each module includes: (i) a circuit protection device; and (ii) a power output connection location.

DETAILED DESCRIPTION OF THE PREFERRED EMBODIMENTS

Figure 1:
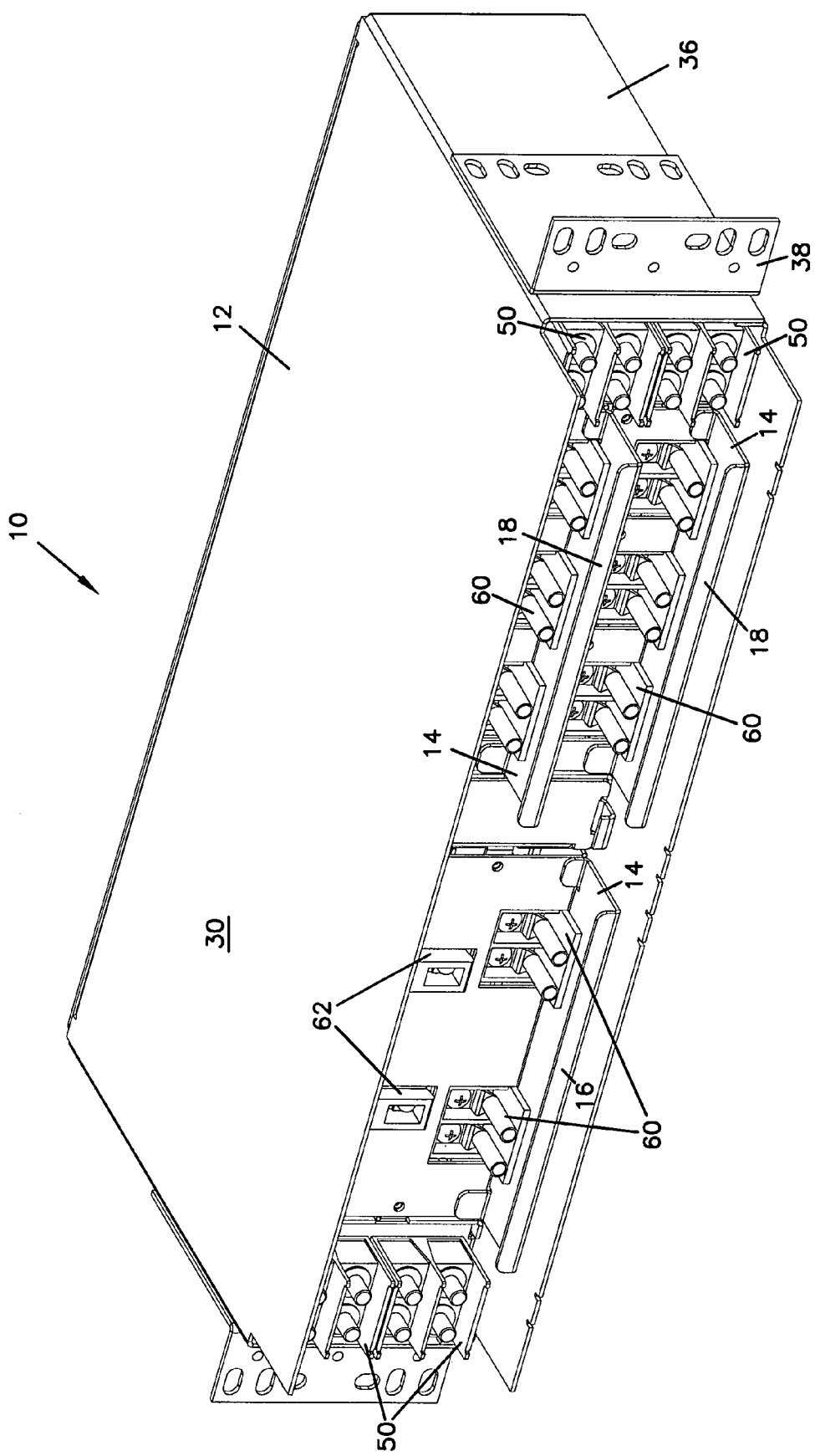
FIG. 1 is a front, top, and right side perspective view of one embodiment of a power distribution panel in accordance with the present invention.
Figure 2:
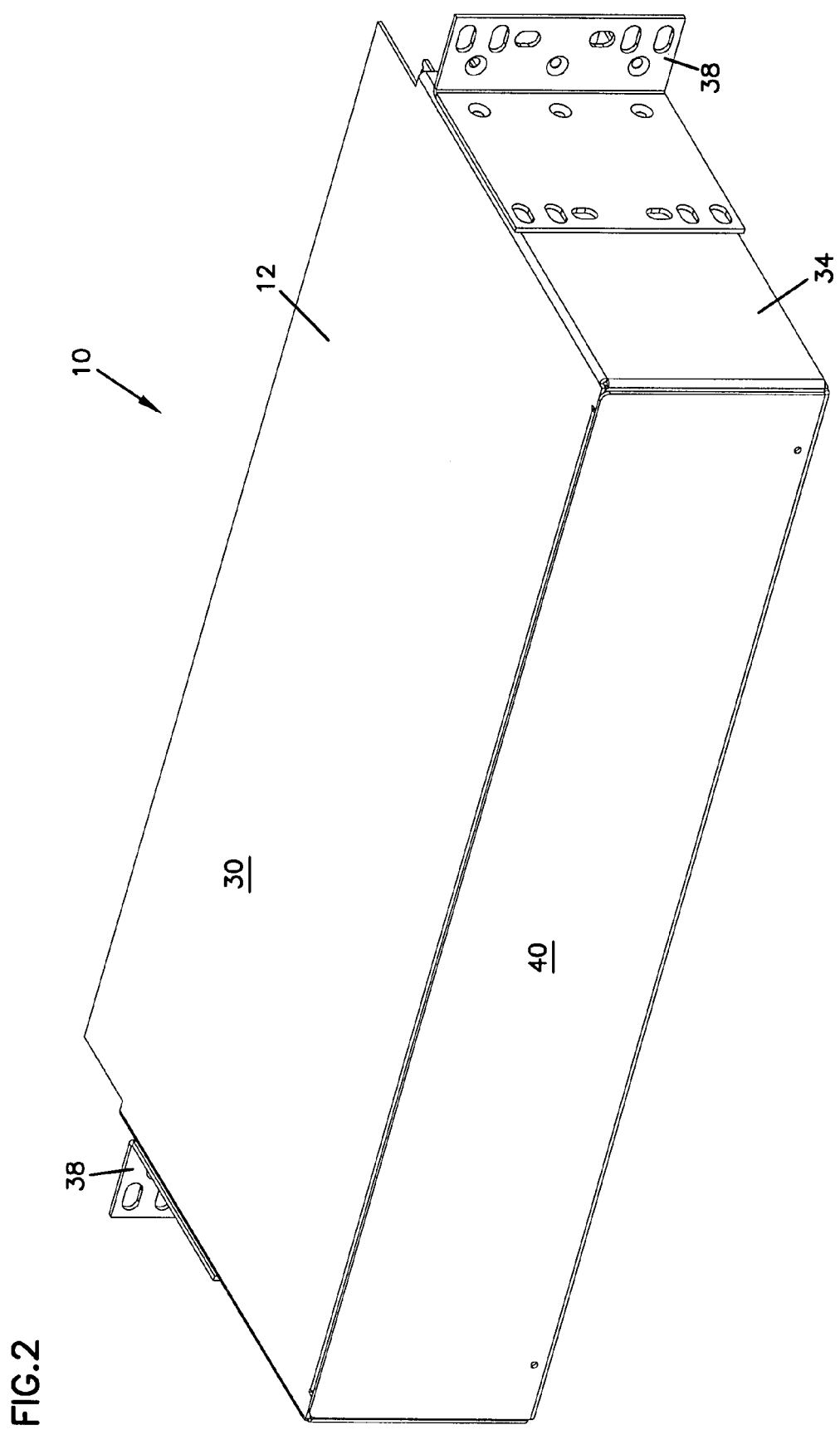
FIG. 2 is a rear, top, and left side perspective view of the power distribution panel of FIG. 1.
Figures 3, 4:
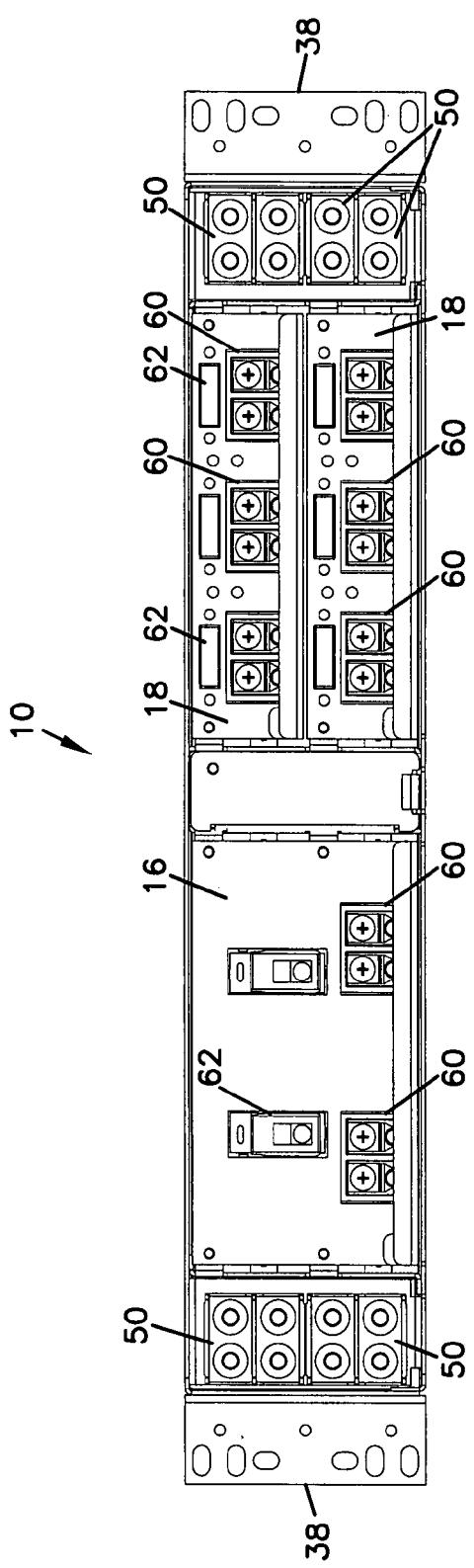
FIG. 3 is a front view of the power distribution panel of FIG. 1.
FIG. 4 is a right side view of the power distribution panel of FIG. 1.
Figure 5:
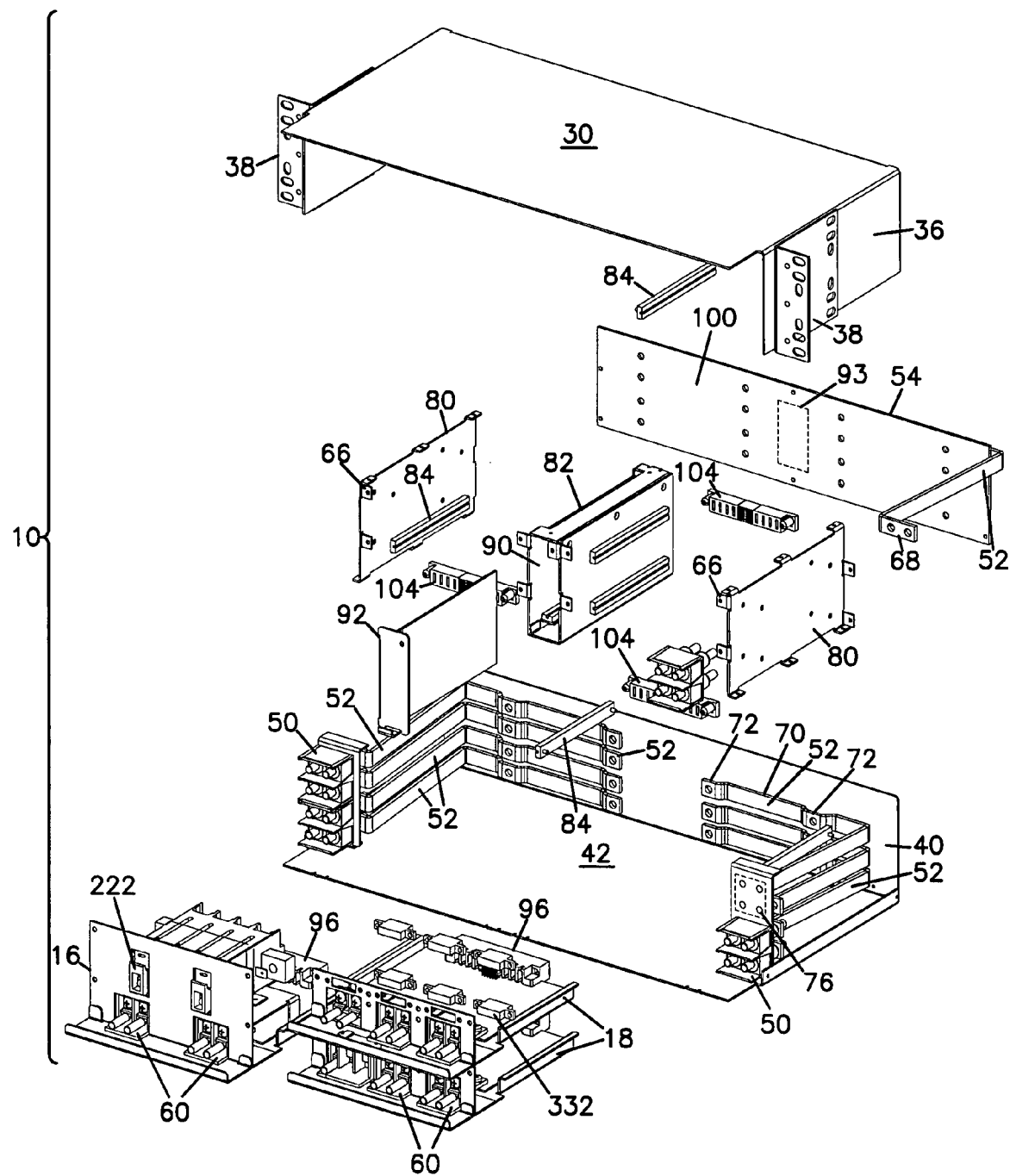
FIG. 5 is an exploded front, top, and right side perspective view of the power distribution panel of FIG. 1.
Figure 6:
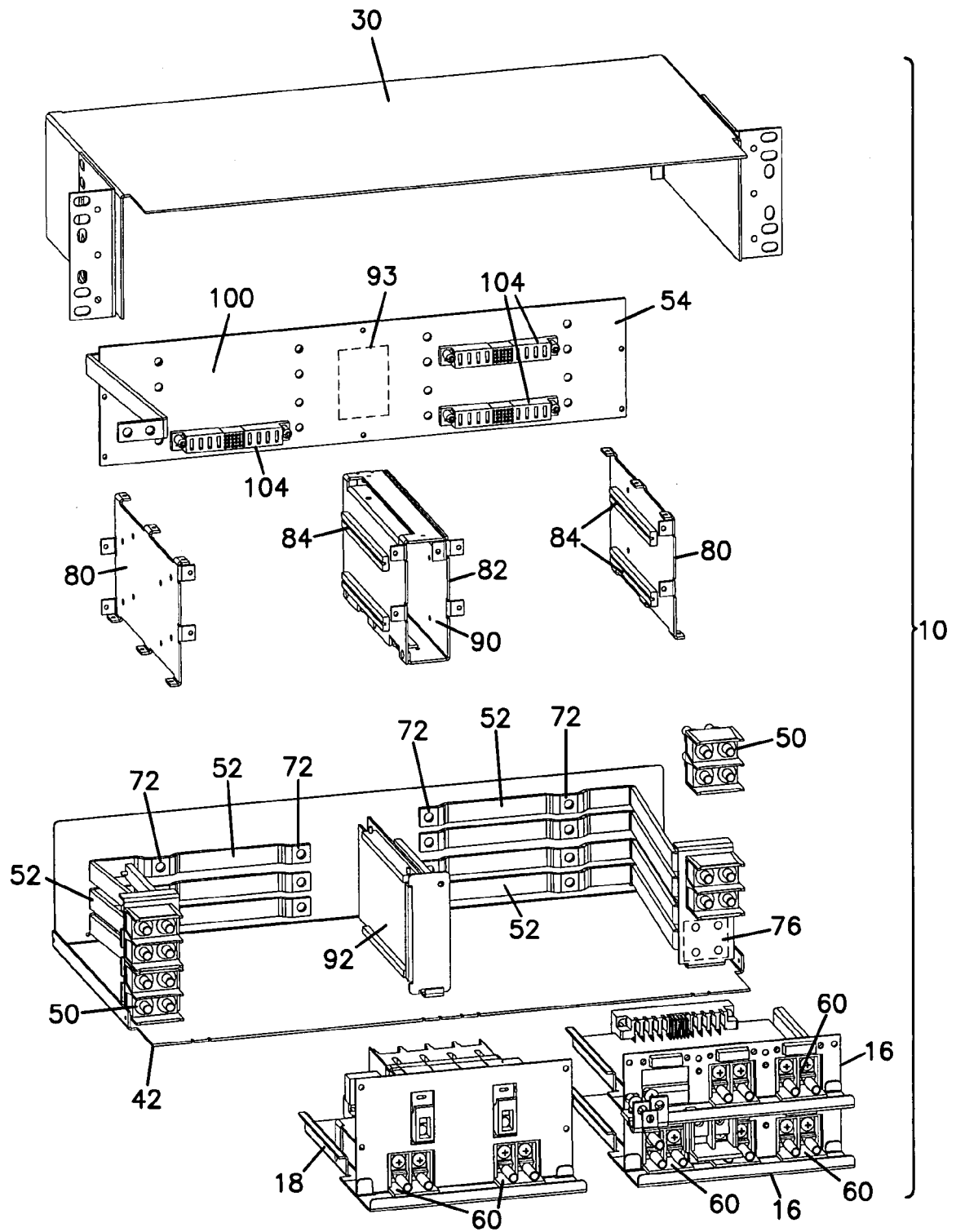
FIG. 6 is an exploded front, top, and left side perspective view of the power distribution panel of FIG. 1.

Referring to FIGS. 1-7, a power distribution system or panel 10 is shown. Power distribution system 10 is a modular design including a panel construction having a chassis 12 and at least one removable circuit module 14. In the illustrated embodiment, one first circuit module 16, and two second circuit modules 18 are shown. First circuit module 16 is positioned in a left side of chassis 12 wherein the first circuit module 16 is of a first design. Two second circuit modules 18 are also shown positioned in a right side of chassis 12 wherein second circuit modules 18 are of a different design from first circuit module 16.

Each circuit module 14 includes circuit distribution components. In the preferred embodiment, the circuit distribution components include a circuit protection device, such as a fuse or a breaker, and a power output arrangement 60. System 10 includes a power input arrangement 50 wherein the circuit protection devices within the modules 14 protect the circuit between the power input arrangement 50 and the power output arrangement 60.

Figure 8:
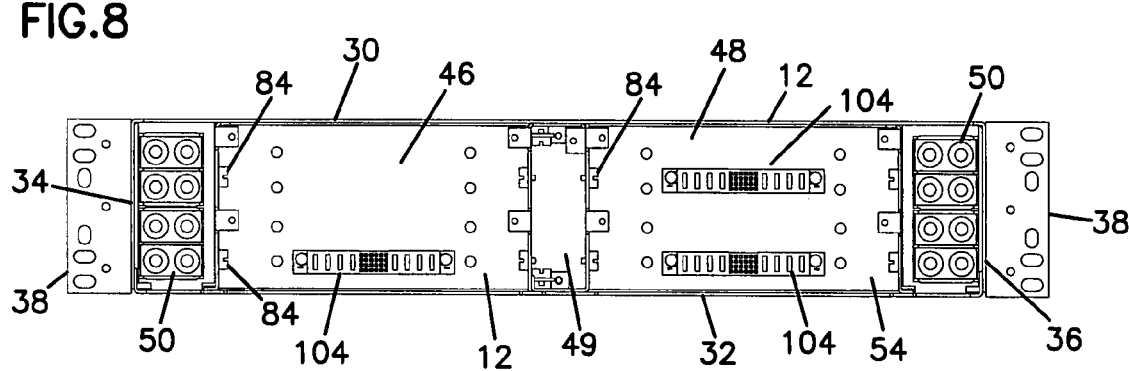
FIG. 8 is a front view of the chassis of the power distribution panel of FIG. 1, shown without modules.
Figure 10:
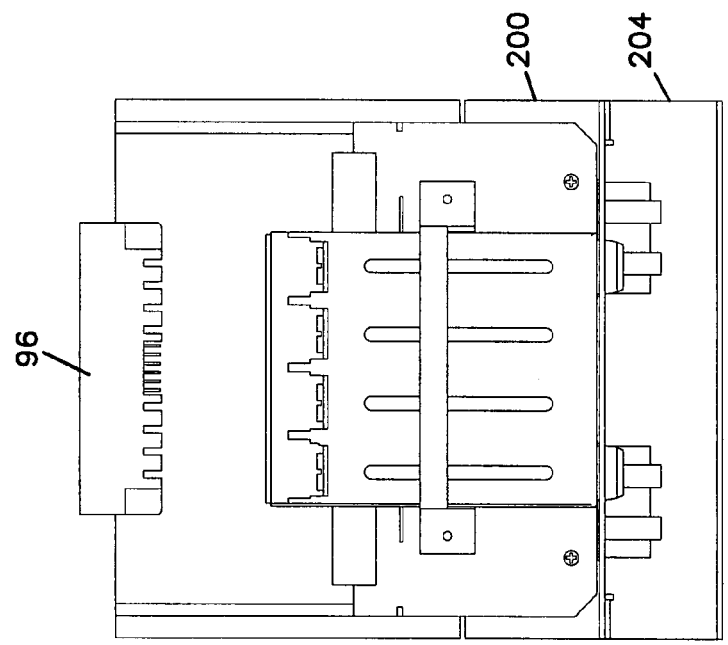
FIG. 10 is a top view of the first circuit module.
Figure 9:
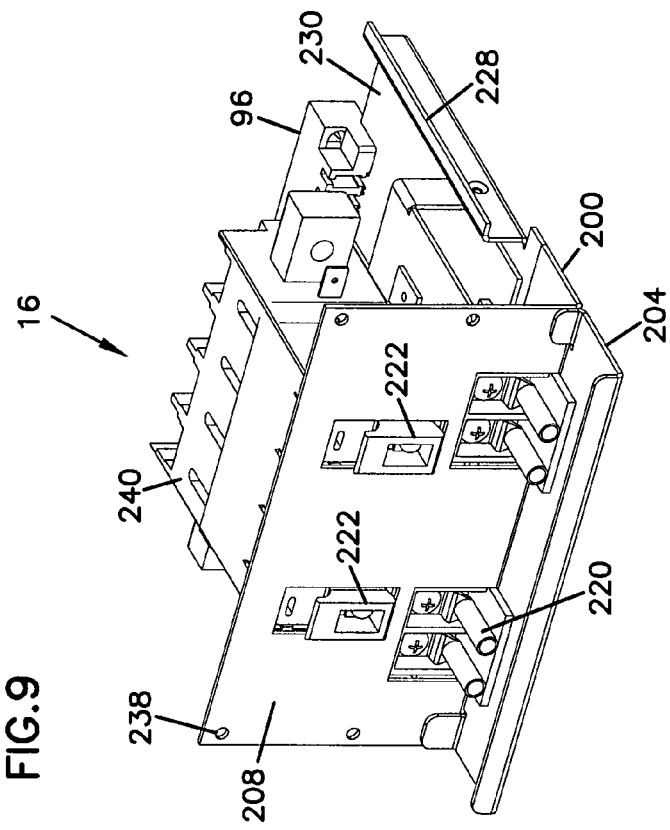
FIG. 9 is perspective view of a first circuit module.
Figure 11:
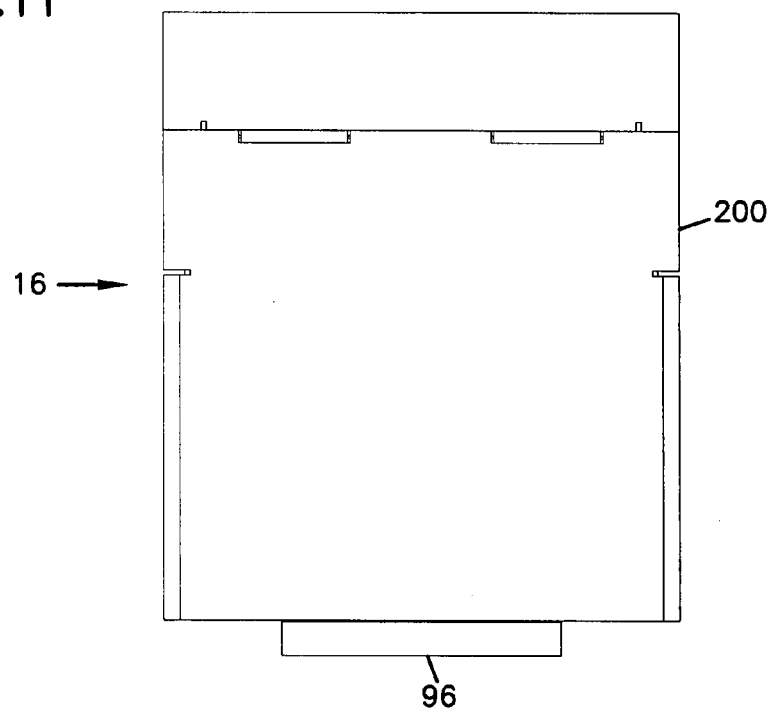
FIG. 11 is a bottom view of the first circuit module.
Figure 12:
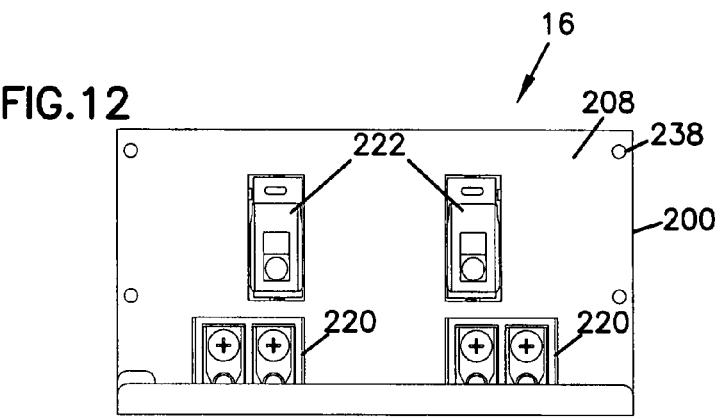
FIG. 12 is a front view of the first circuit module.
Figure 13:
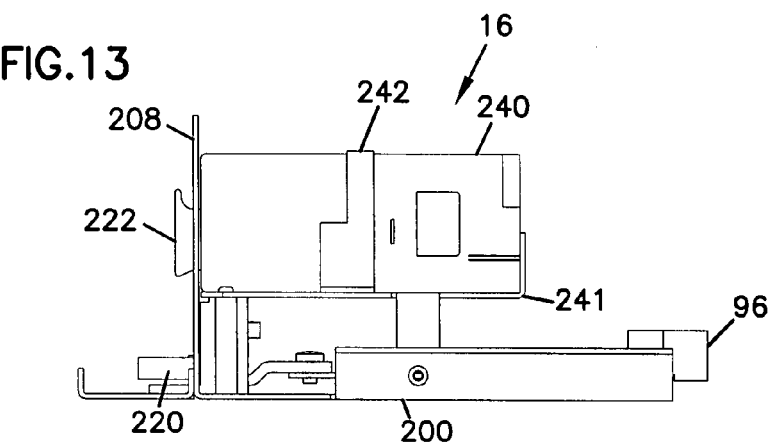
FIG. 13 is a right side view of the first circuit module.
Figure 14:
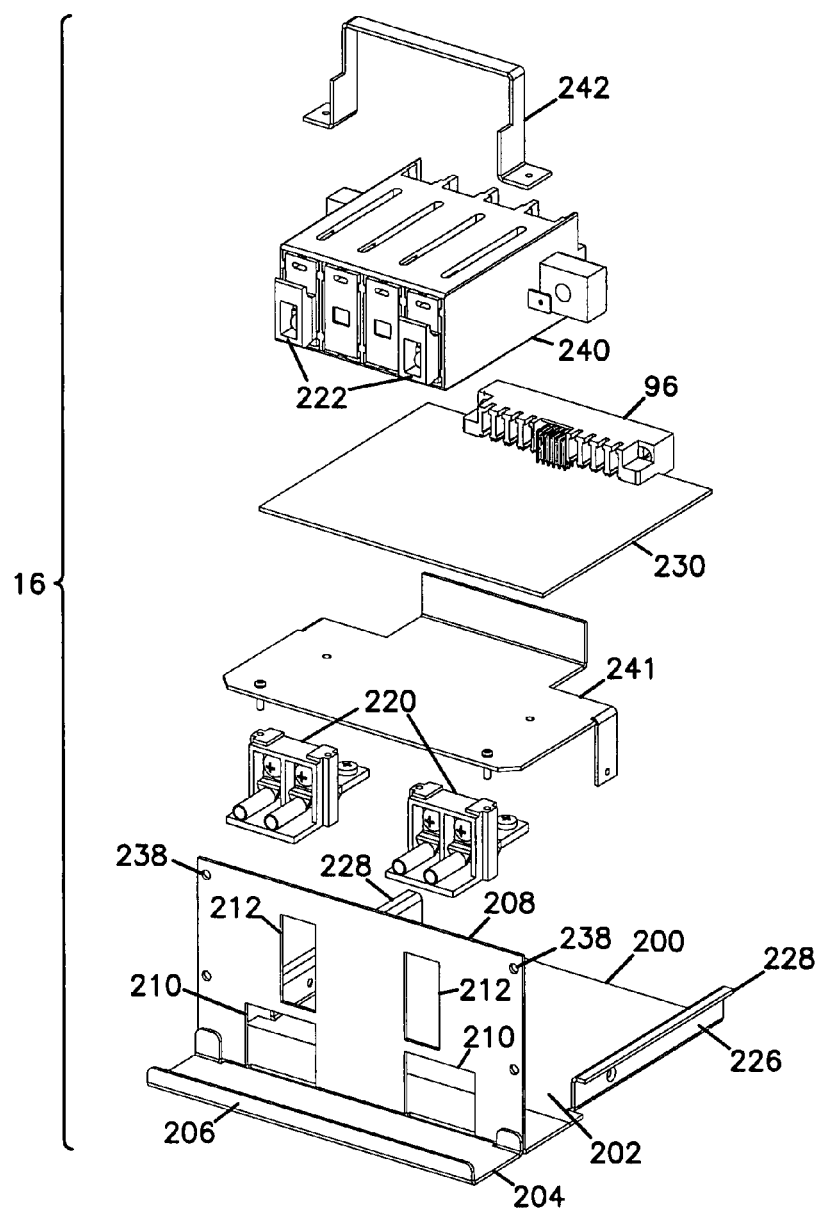
FIG. 14 is an exploded perspective view of the first circuit module.
Figure 15:
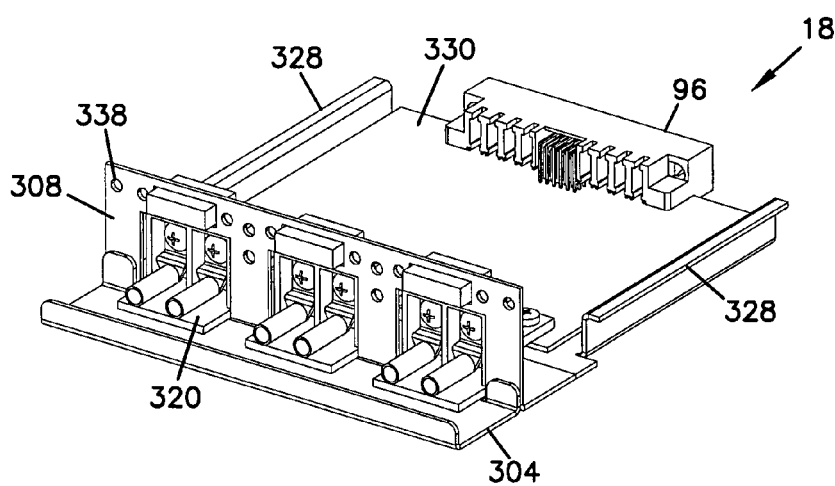
FIG. 15 is a perspective view of a second circuit module.
Figure 16:
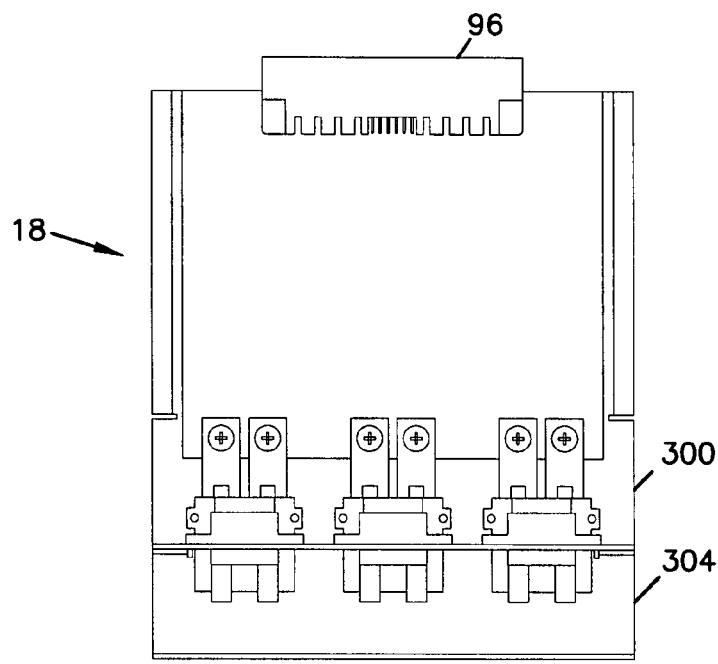
FIG. 16 is a top view of the second circuit module.
Figure 17:
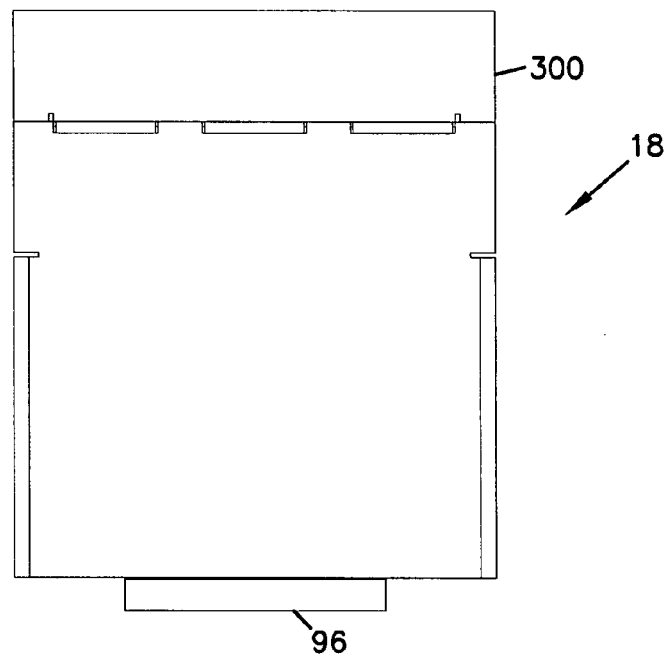
FIG. 17 is a bottom of the second circuit module.
Figure 18:
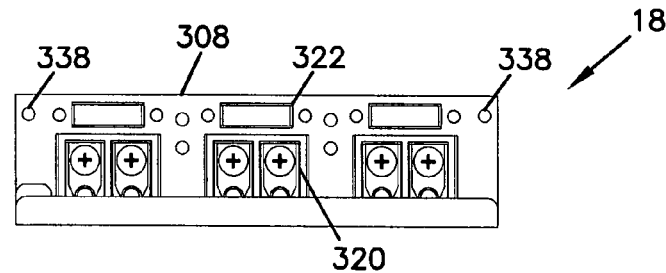
FIG. 18 is a front view of the second circuit module.
Figure 20:
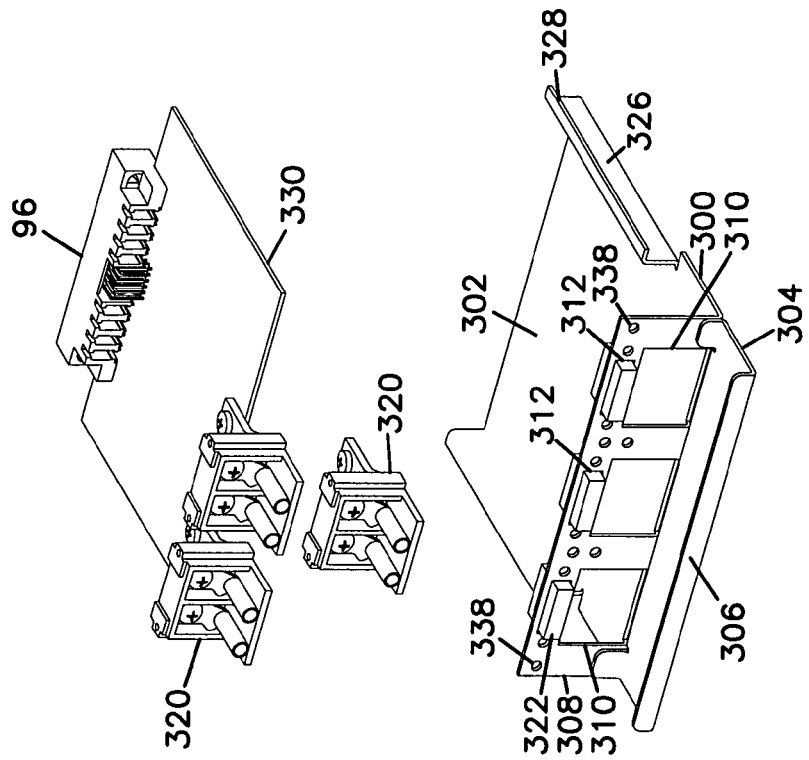
FIG. 20 is an exploded perspective view of the second circuit module.
Figure 19:
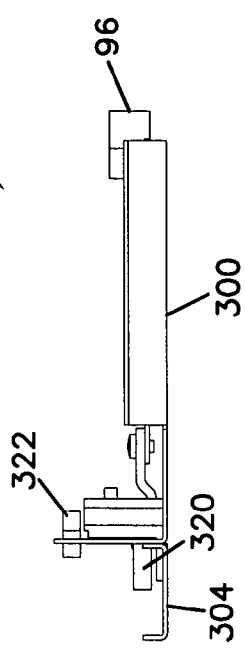
FIG. 19 is a right side view of the second circuit module.
Figure 21:
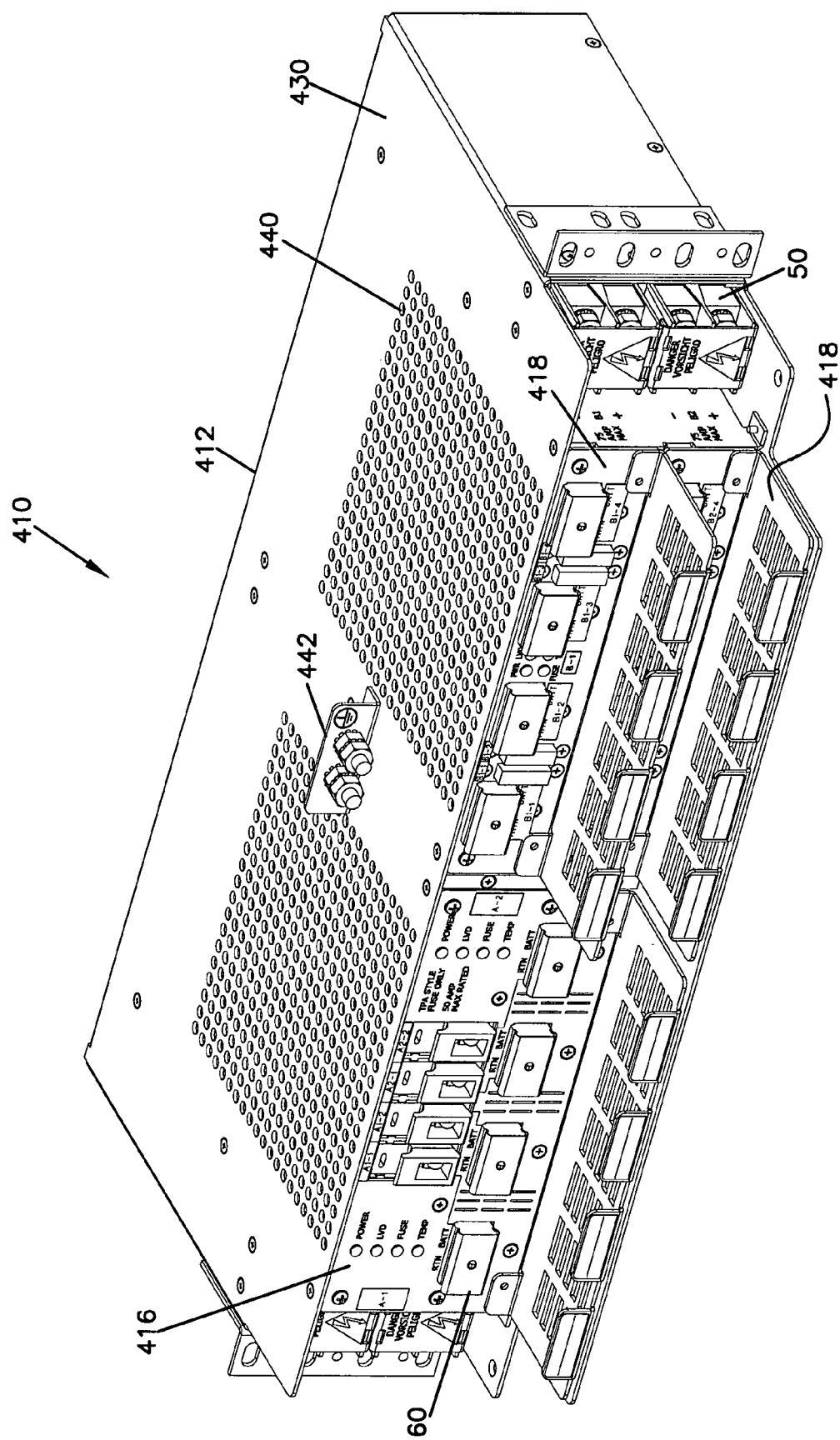
FIG. 21 is a front, top, and right side perspective view of a second embodiment of a power distribution panel in accordance with the present invention.
Figure 22:
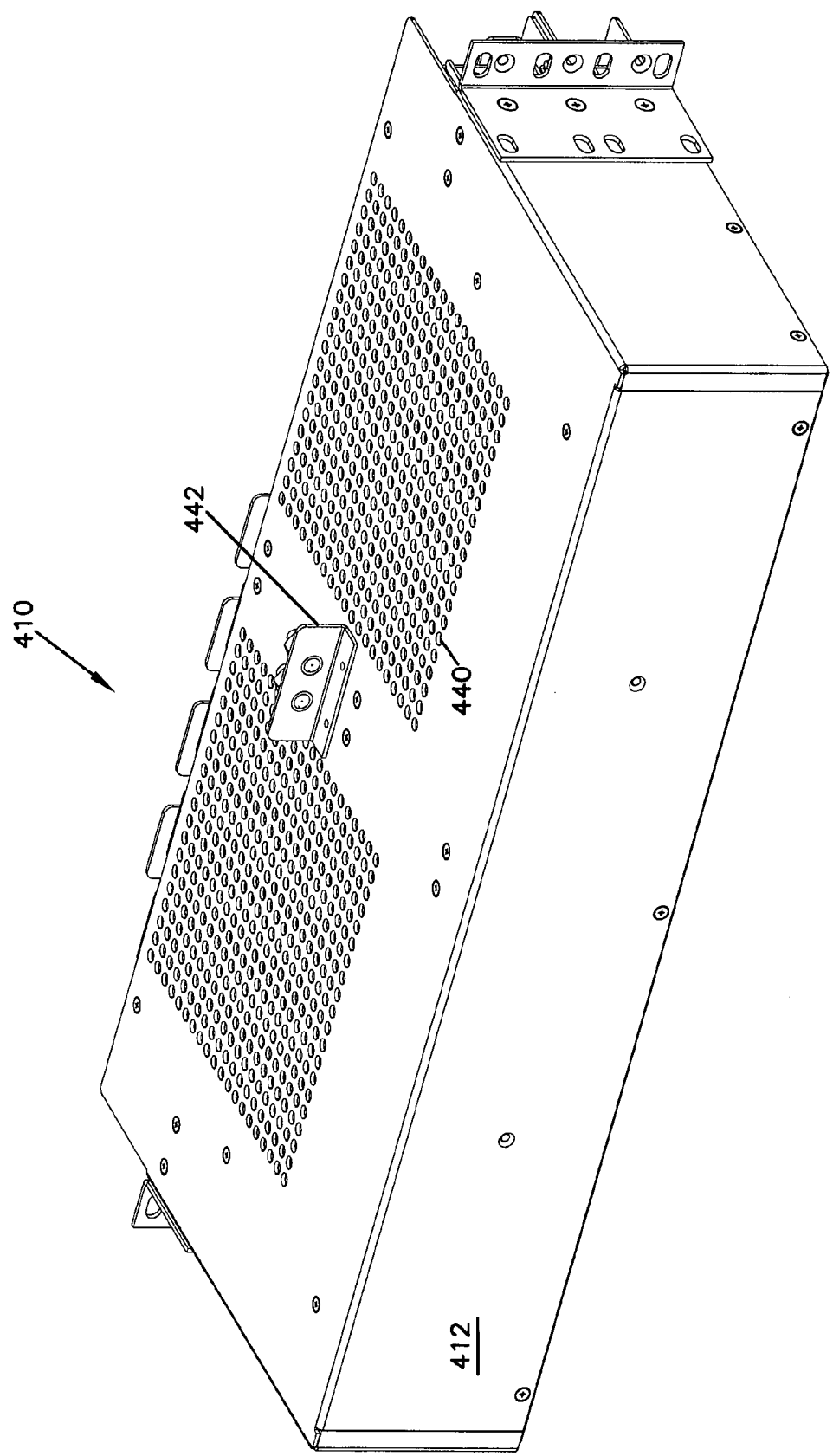
FIG. 22 is a rear, top, and left side perspective view of the power distribution panel of FIG. 21.
Figure 23:
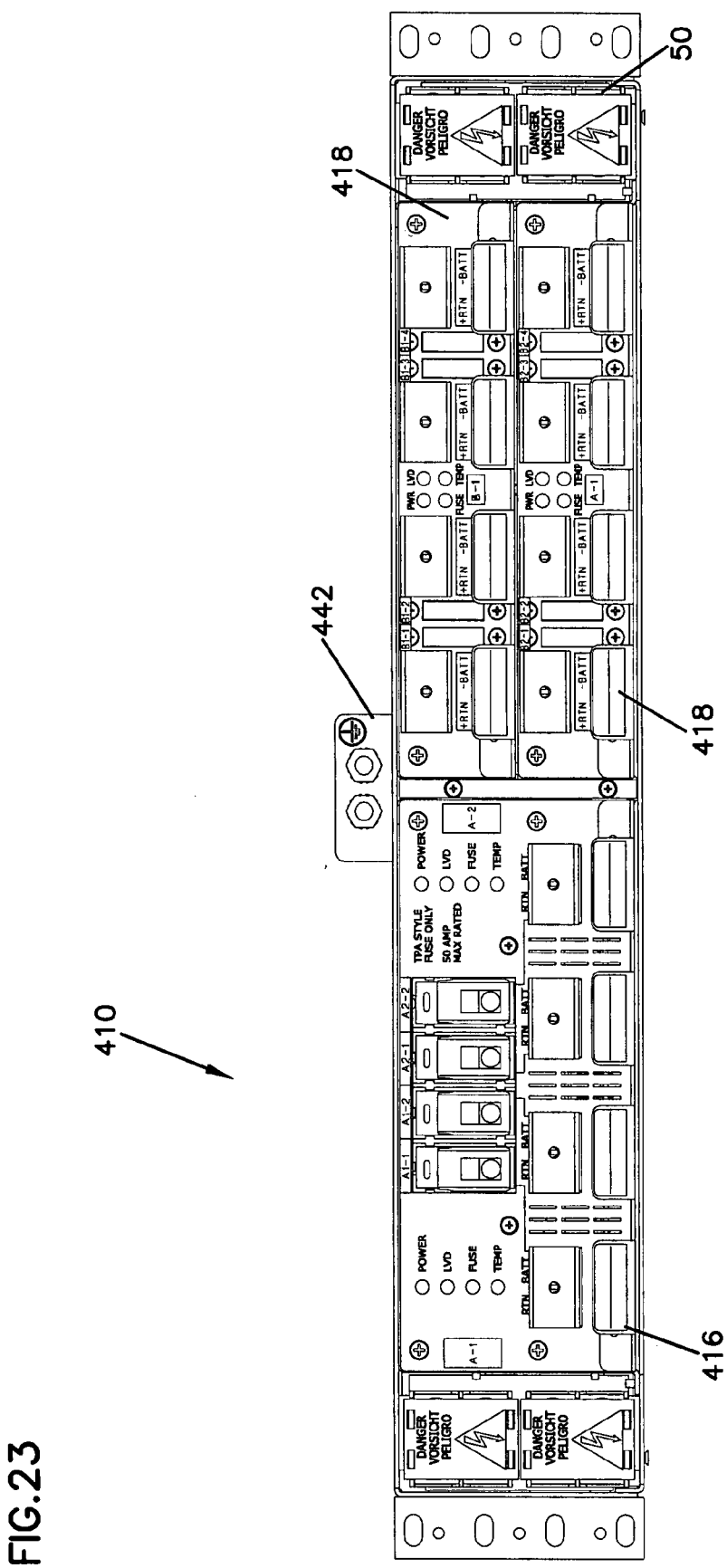
FIG. 23 is a front view of the power distribution panel of FIG. 21.
Figure 24:
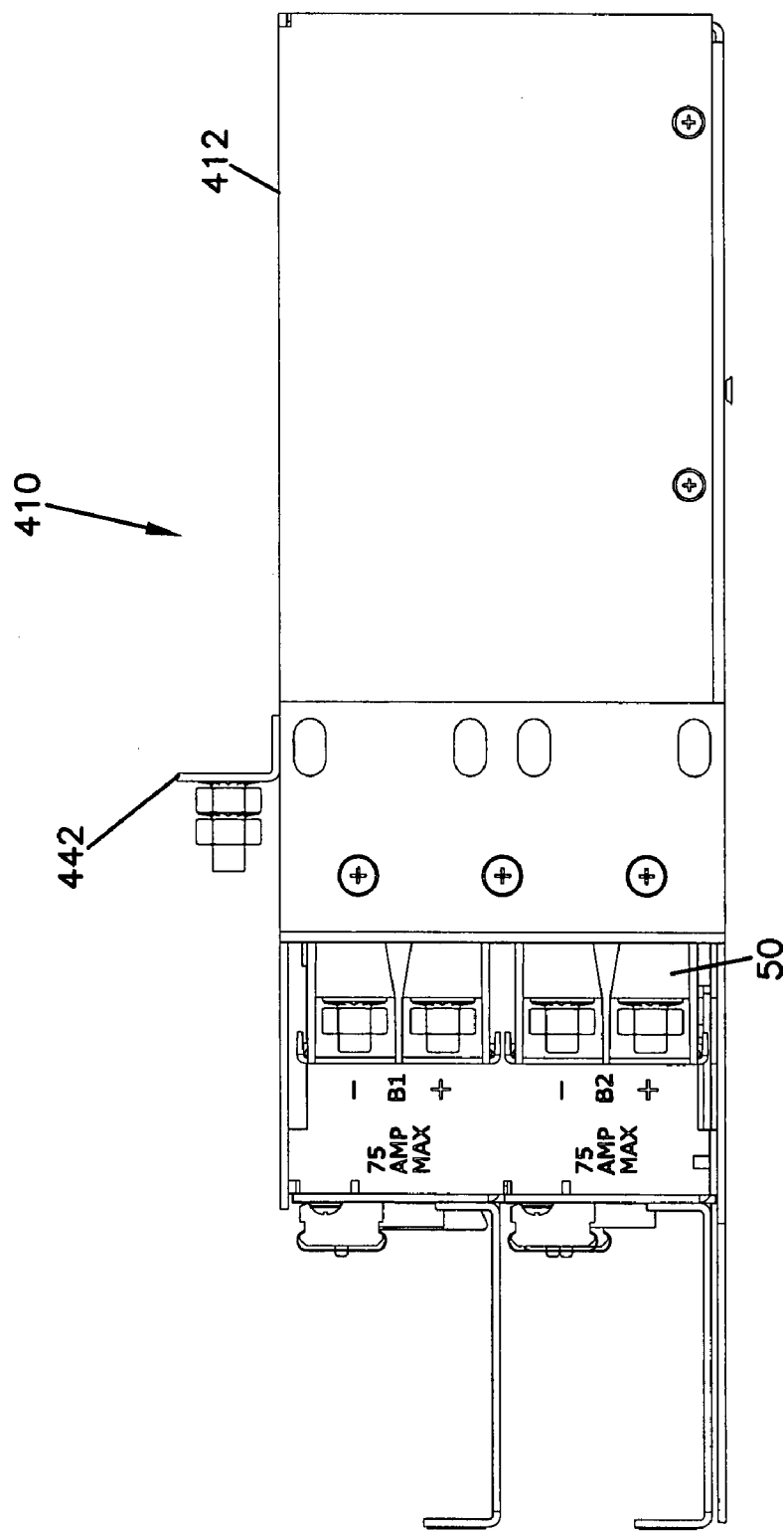
FIG. 24 is a right side view of the power distribution panel of FIG. 21.
Figure 25:
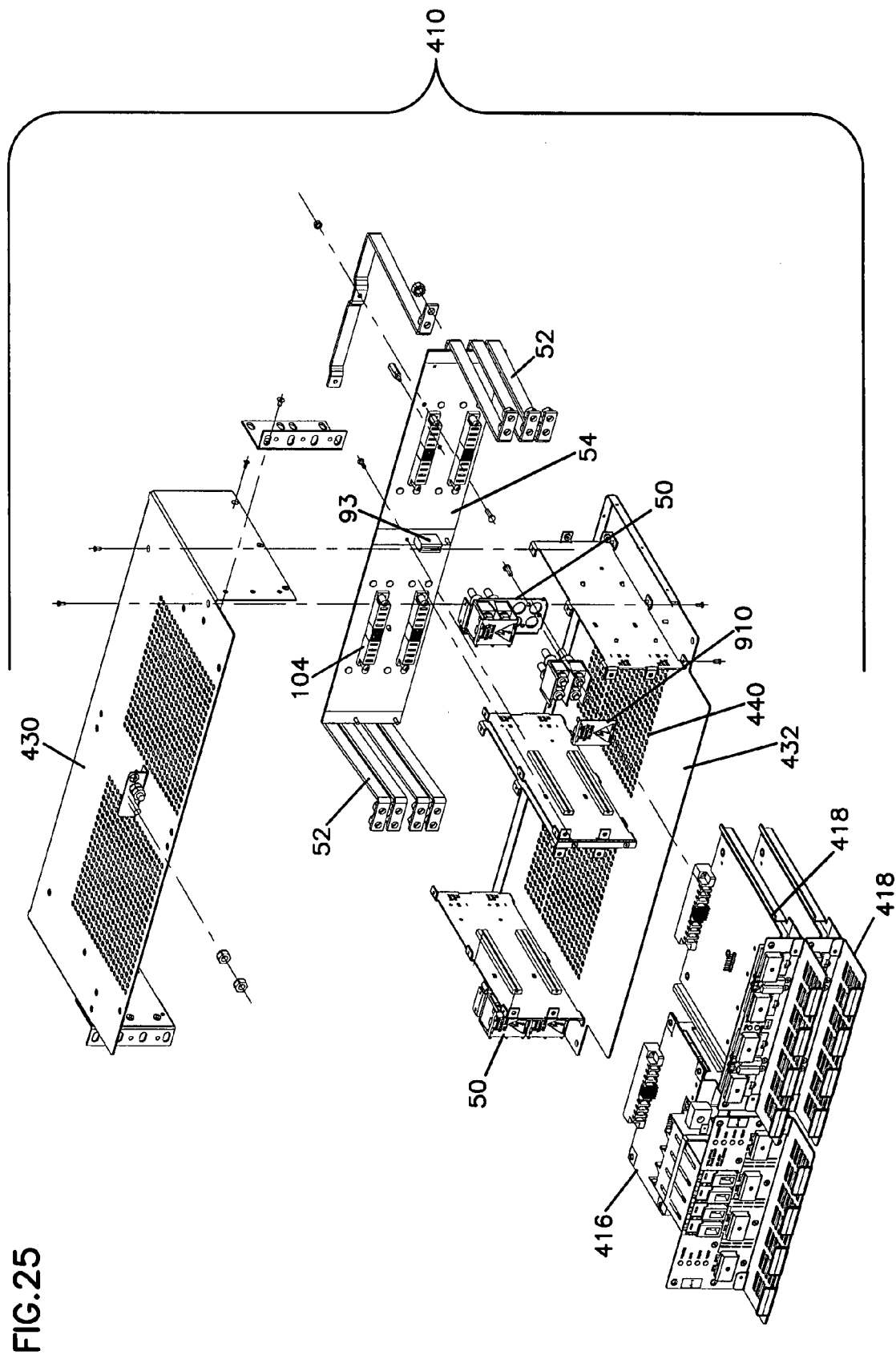
FIG. 25 is an exploded front, top, and right side perspective view of the power distribution panel of FIG. 21.

Referring also to FIG. 8, chassis 12 includes a top 30, a spaced apart bottom 32 and opposite sides 34, 36. Adjacent to sides 34, 36 are brackets 38 for mounting to a rack, cabinet, or other telecommunications equipment. Chassis 12 includes a rear 40. Chassis 12 defines an interior 42 having an open front 44. Chassis interior 42 in the illustrated embodiment includes a first module receiving area 46 on a left side of chassis 12, and a second module receiving area 48 on a right side of chassis 12. A central area 49 of chassis 12 is provided. In some embodiments, central area 49 can be used for alarming and/or system management components.

Panel 10 includes power input connectors or terminals 50 connected to internal bus bars 52. A backplane 54, such as a printed circuit board, is positioned adjacent to rear 40 of chassis 12. Bus bars 52 connect input connectors 50 to backplane 54. Modules 16, 18 interconnect with backplane 54 to enable power distribution through modules 16, 18. Each module 16, 18 includes at least one power output connector 60, and a circuit protection device 62, such as a fuse or a breaker.

Figure 7:
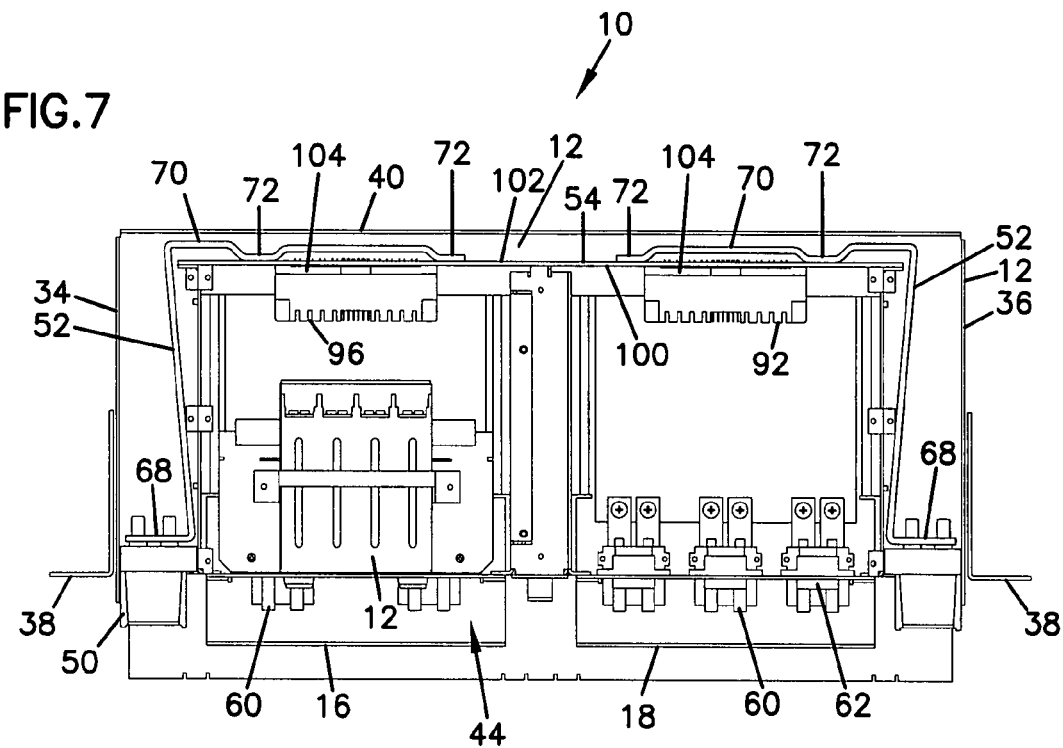
FIG. 7 is a top view of the power distribution panel of FIG. 1, shown with a top cover portion removed.

As shown in FIG. 7, bus bars 52 are generally Z-shaped metallic bars extending from first ends 68 to opposite ends 70. Opposite ends 70 define dual contact points 72 which can be mounted with fasteners (not shown) to backplane 54 to electrically interconnect bus bars 52 and backplane 54. Ends 68 of bus bars 52 are mounted to input terminals 50 at input terminal mounts 76 of chassis 12.

Interior 42 of chassis 12 includes side supports 80 and central support 82. Side supports 80 and central support 82 include a plurality of module guides 84 which define longitudinal slots for receipt of longitudinal rails of each of modules 16, 18. Central support 82 defines an interior for receiving an alarm card 92. Alarm card 92 mounts to alarm card connector 93 on backplane 54. Alarm card 92 is optional if such functionality is employed by panel 10.

Each module 16, 18 includes a rear module connector 96. Backplane 54 includes a front face 100, and opposite rear face 102. Positioned on front face 100 are a plurality of mating connectors 104 for electrically connecting to the module connectors 96.

Referring now in greater detail to FIGS. 9-14, first circuit module 16 is shown. Module 16 includes a frame 200 including a base 202, and a front tray 204 with a front lip 206. A vertical support 208 extends up from base 202 and defines a plurality of openings 210, 212 for output terminal units 220, and fuses 222, respectively. Base 202 also includes sides 226 and longitudinal rails 228. A printed circuit board 230 connects between module connector 96 and the circuit elements including output terminal units 220 and fuses 222. Fuse holder or block 240 with fuses 222 is held in place by a support tray 241 and a strap 242.

Referring now to FIGS. 15-20, one of the second circuit modules 18 is shown. Second module 18 includes a frame 300 including a base 302, a front tray 304, and a front lip 306. A vertical support 308 defines a plurality of openings 310, 312 for output terminal units 320 and fuses 322, respectively. Frame 300 includes sides 326, and longitudinal rails 328. A printed circuit board 330 connects between module connector 96 and the circuit elements including output terminal units 320 and fuses 322.

Modules 16, 18 mount to chassis 12 with fasteners (not shown) through holes 238, 338 in each module, and holes 66 in supports 80 of chassis 12. Front trays 204, 304 are provided for cable management of the power output cables. Front lips 206, 306 also provide a convenient gripping surface.

Because of the modular design for chassis 12 and modules 16, 18, repair or replacement of parts is facilitated. Should upgrades become desirable, new modules can be provided. The modules also allow for distributed control functions, such as in the case of redundant (dual feed) applications. The OR-ing diodes or other controllers can be locally placed on each module.

Each module includes the desired circuit protection components. Module 16 in the illustrated embodiment is a TPA type fuse. Modules 18 are GMT type fuses. Other fuse types or breakers can be used.

Referring now to FIGS. 21-52, further embodiments of power distribution systems or panels similar to panel 10 are shown. In FIGS. 21-28, a similar panel 410 is shown having a chassis 412, a first circuit module 416, and two second circuit modules 418. Alternatively, panel 410 can hold two first circuit modules 416, or four second circuit modules 418.

Chassis 430 includes air flow openings 440 on a top 430, and on a bottom 432. Chassis 430 further includes a forward facing ground 442 on top 430.

As with panel 10, first circuit module 416 and second circuit modules 418 are removable from chassis 430. Module 416 in the illustrated embodiment is a TPA type fuse with four fuses instead of two as noted in panel 10. Modules 318 are GMT type fuses, each including four fuses, instead of three as noted above for modules 18.

Figure 26:
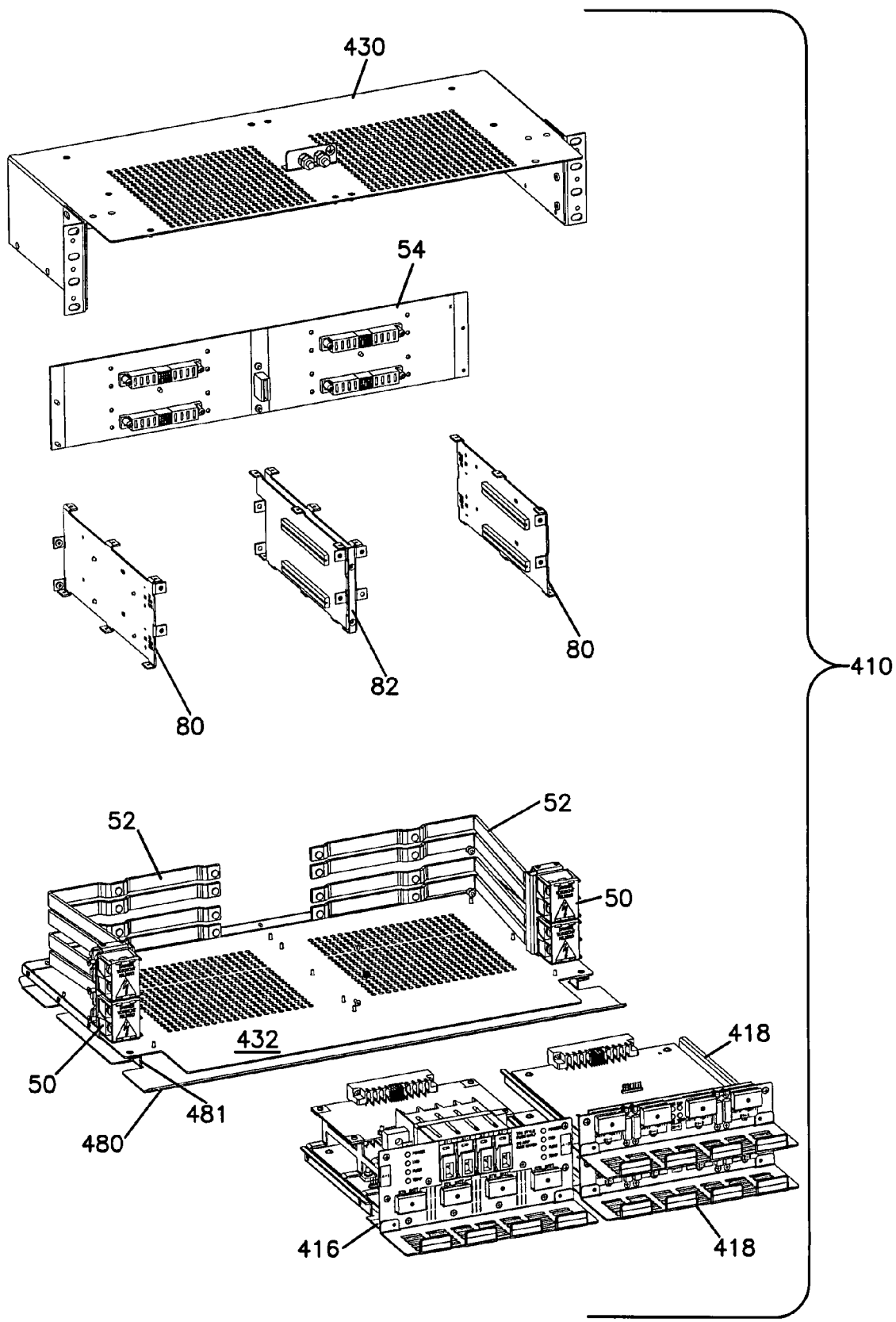
FIG. 26 is an exploded front, top, and left side perspective view of the power distribution panel of FIG. 21.
Figure 27:
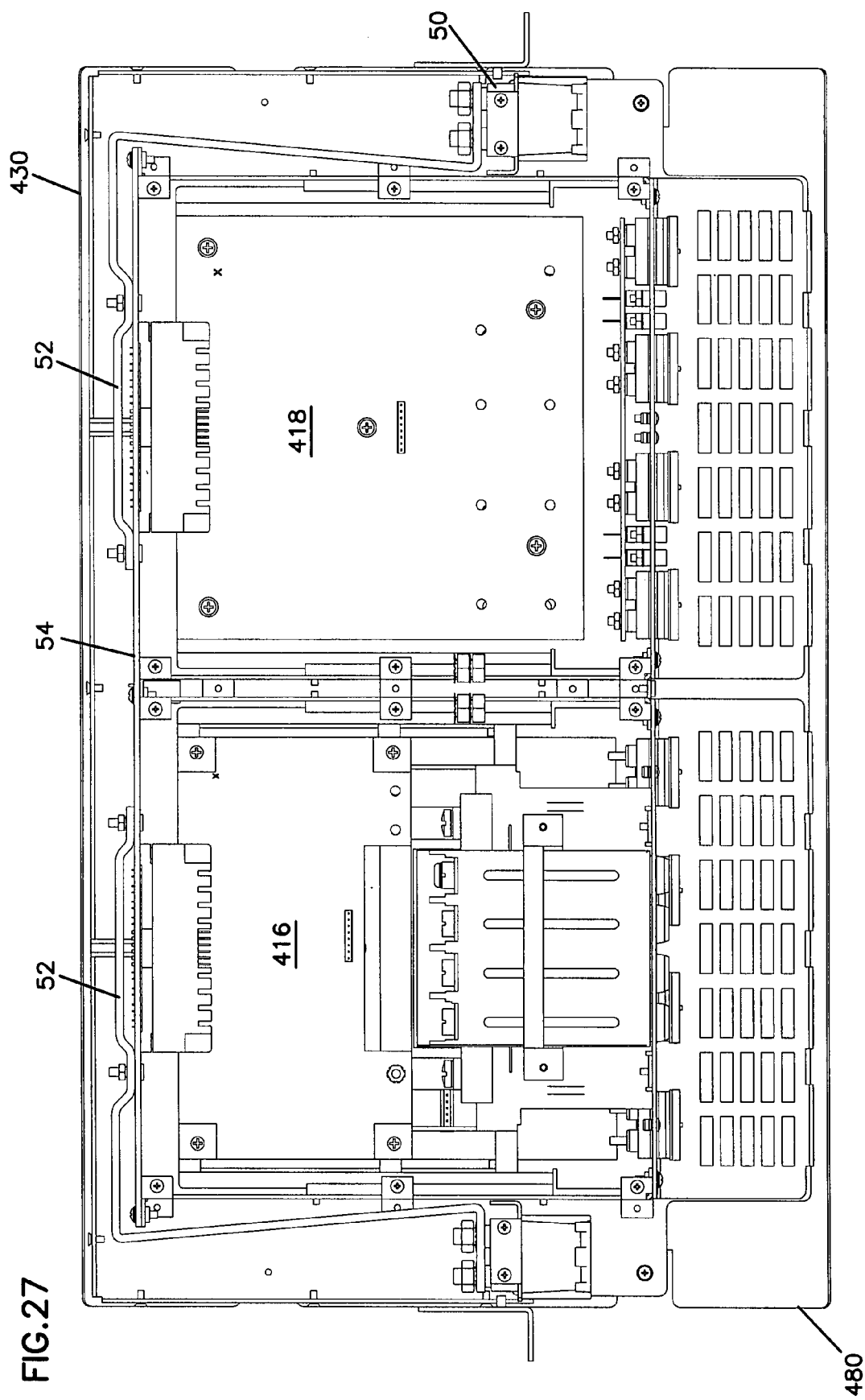
FIG. 27 is a top view of the power distribution panel of FIG. 21, shown with a top cover portion removed.
Figure 28:
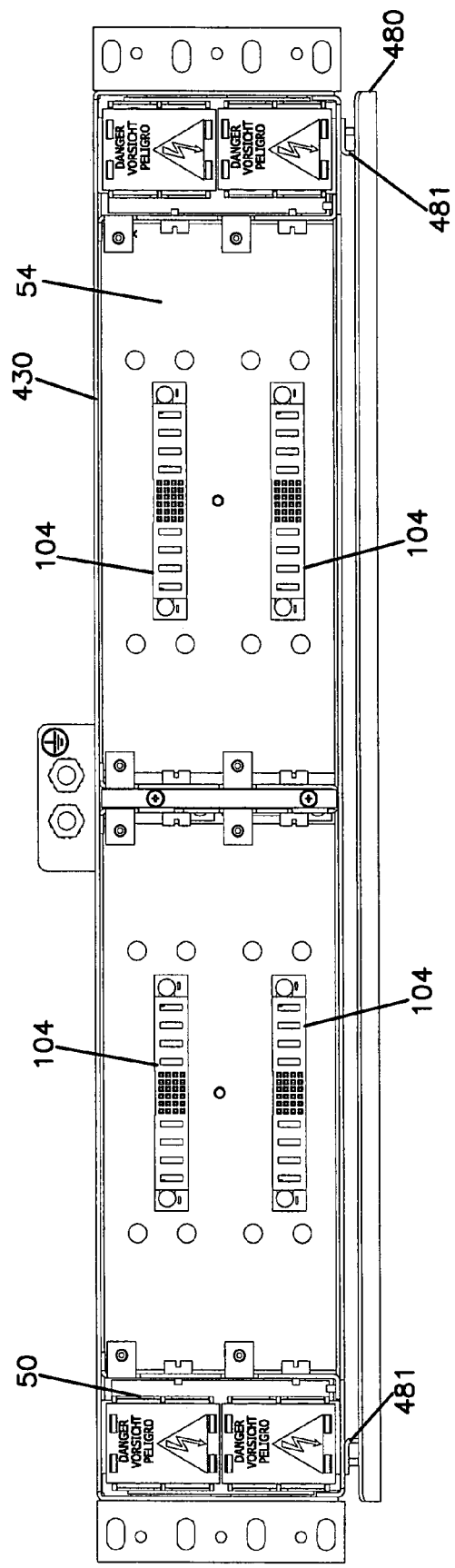
FIG. 28 is a front view of the chassis of the power distribution panel of FIG. 21, shown without modules.

Referring now to FIGS. 26-28, a baffle plate 480 is shown mounted to a bottom 432 of chassis 430. Baffle plate 480 is spaced from bottom 432 by spacers 481 so as to allow airflow communication with openings 440 in bottom 432. Baffle plate 480 also functions as an airflow blocker to block warm air from below chassis 430 from entering into chassis 430, such as from heat emitting equipment mounted below.

Figure 29:
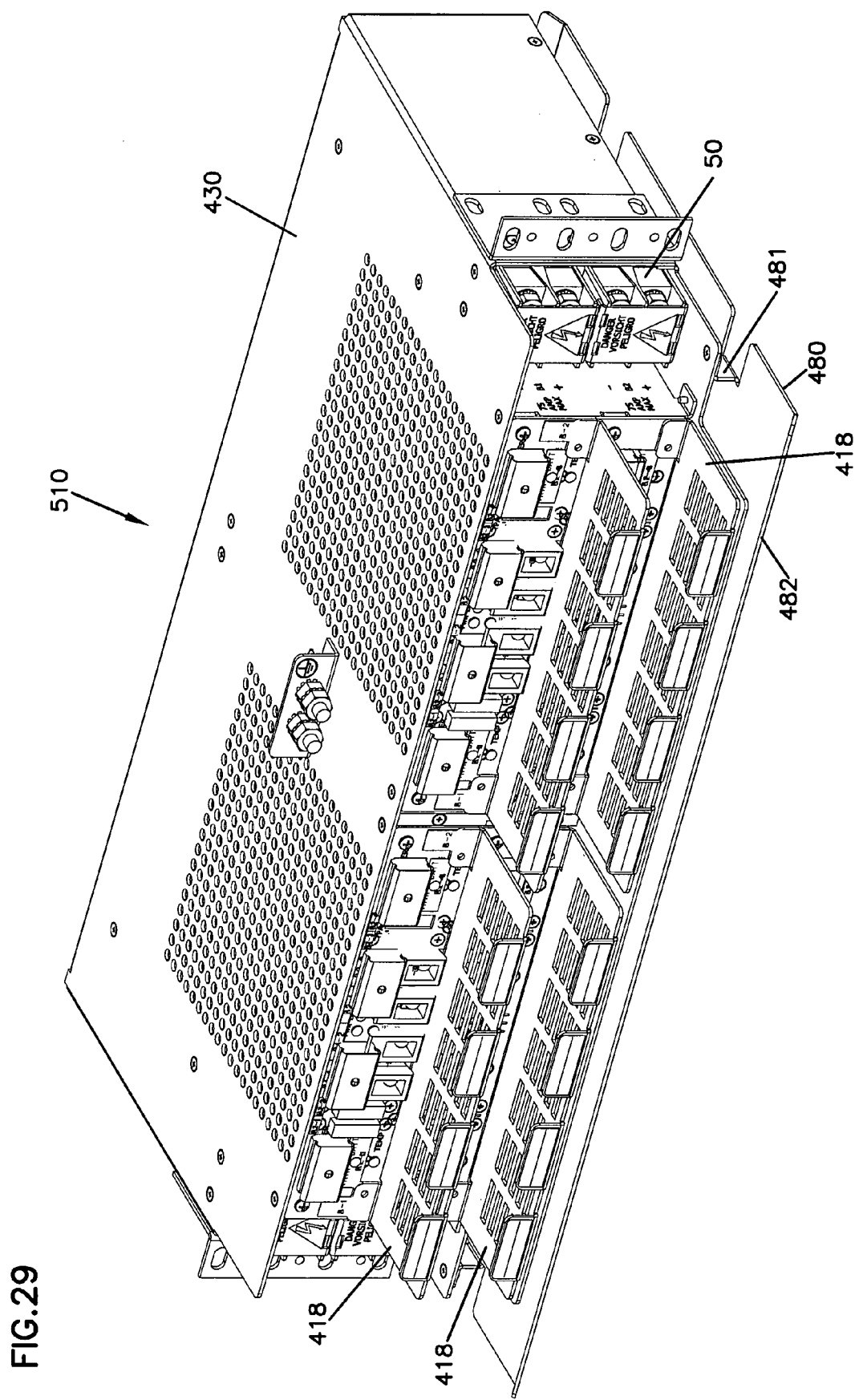
FIG. 29 is a front, top, and right side perspective view of a third embodiment of a power distribution panel in accordance with the present invention.
Figure 30:
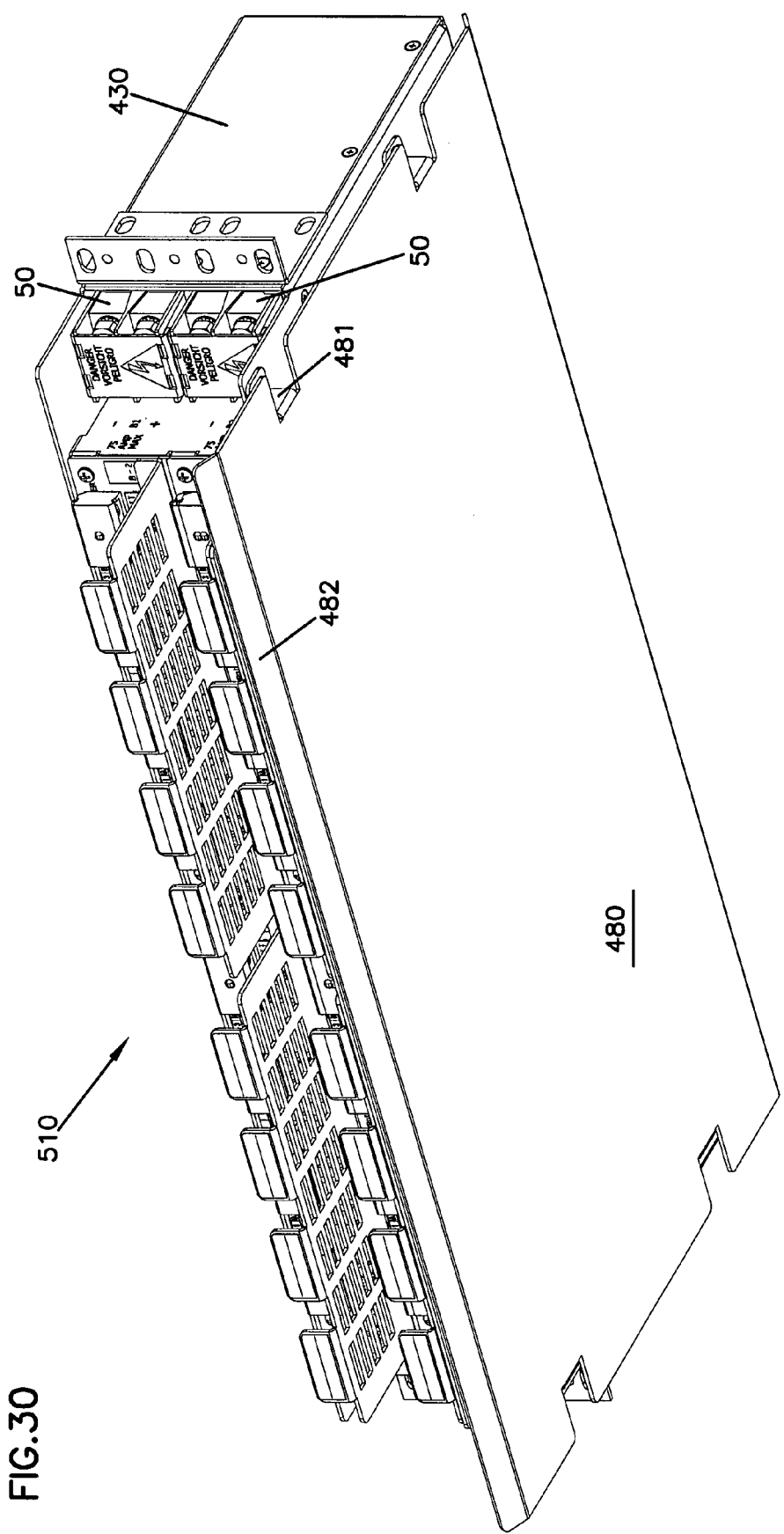
FIG. 30 is a front, bottom, and right side perspective view of the power distribution panel of FIG. 29.
Figure 31:
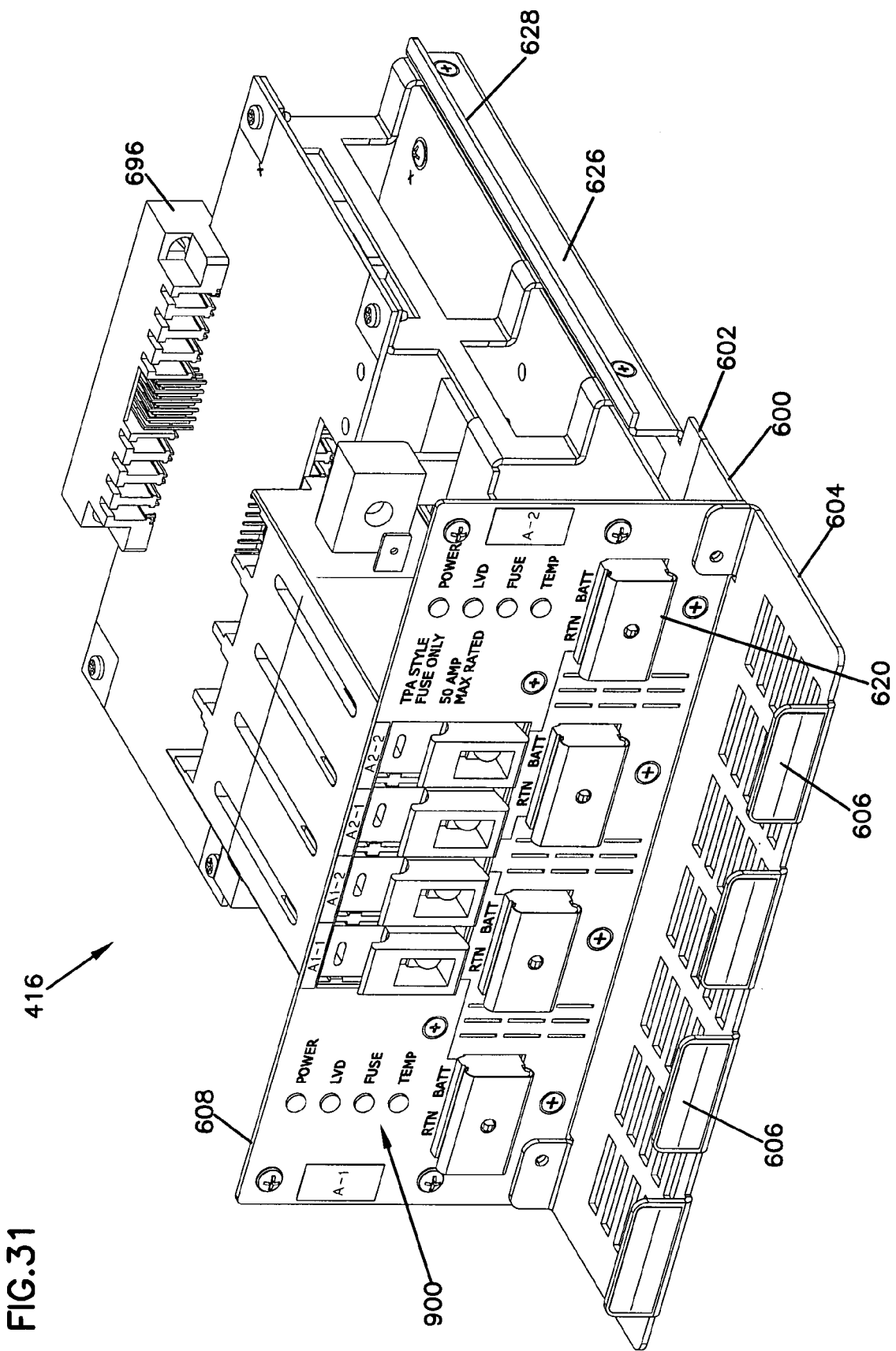
FIG. 31 is a front perspective view of a first circuit module of the power distribution panel of FIG. 21.
Figure 32:
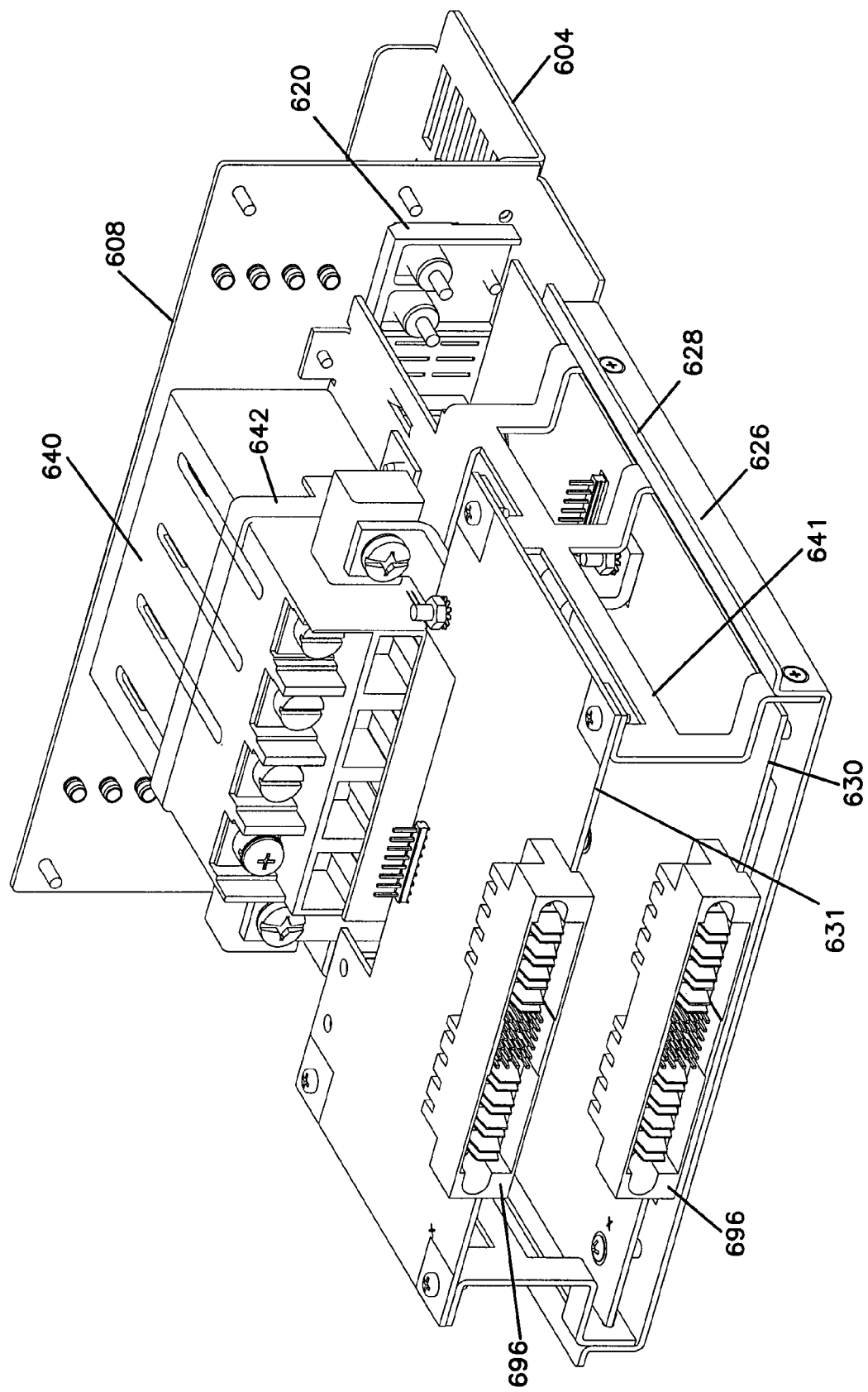
FIG. 32 is a rear perspective view of the first circuit module of FIG. 31.
Figure 33:
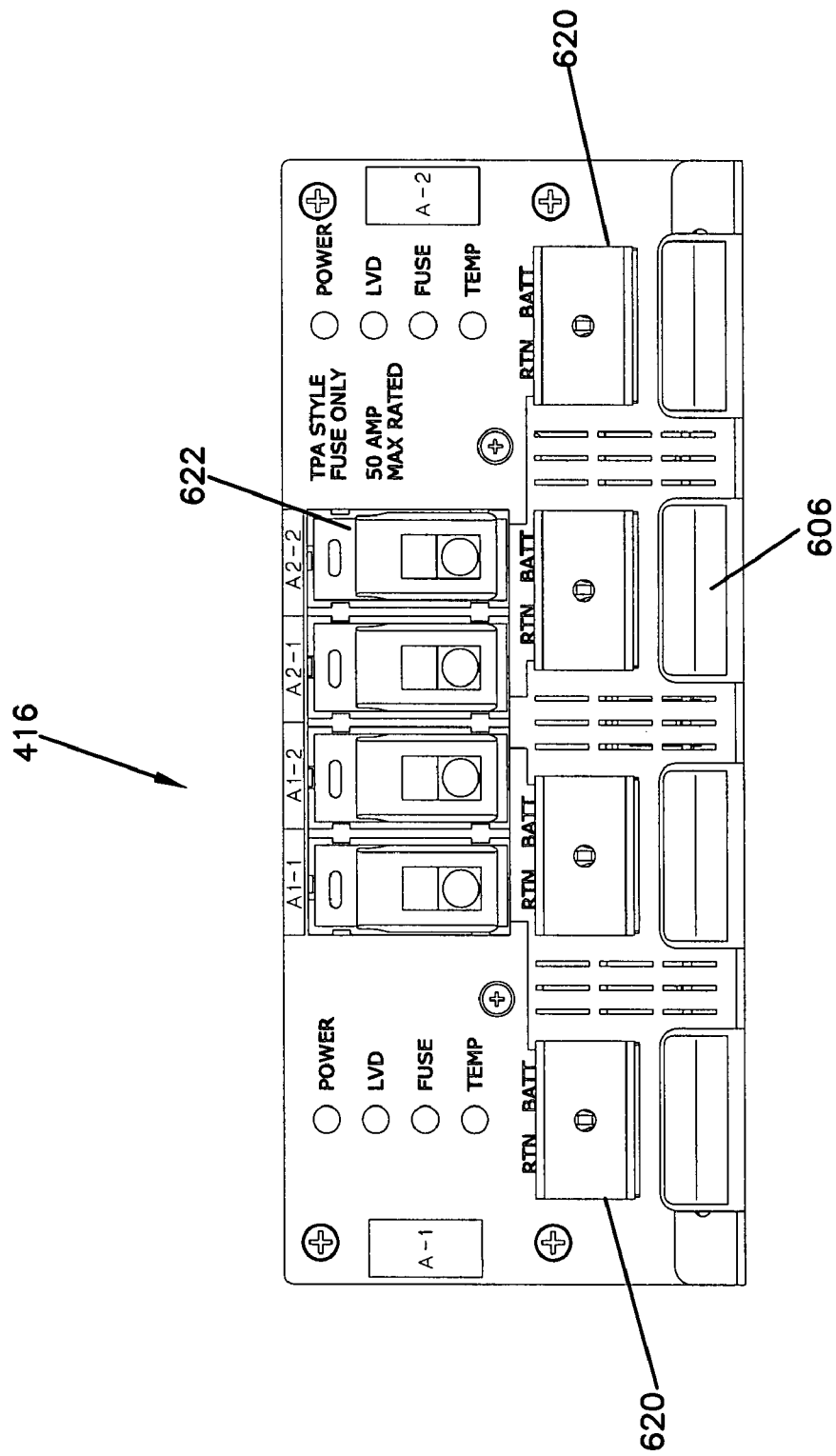
FIG. 33 is a front view of the first circuit module of FIG. 31.
Figure 37:
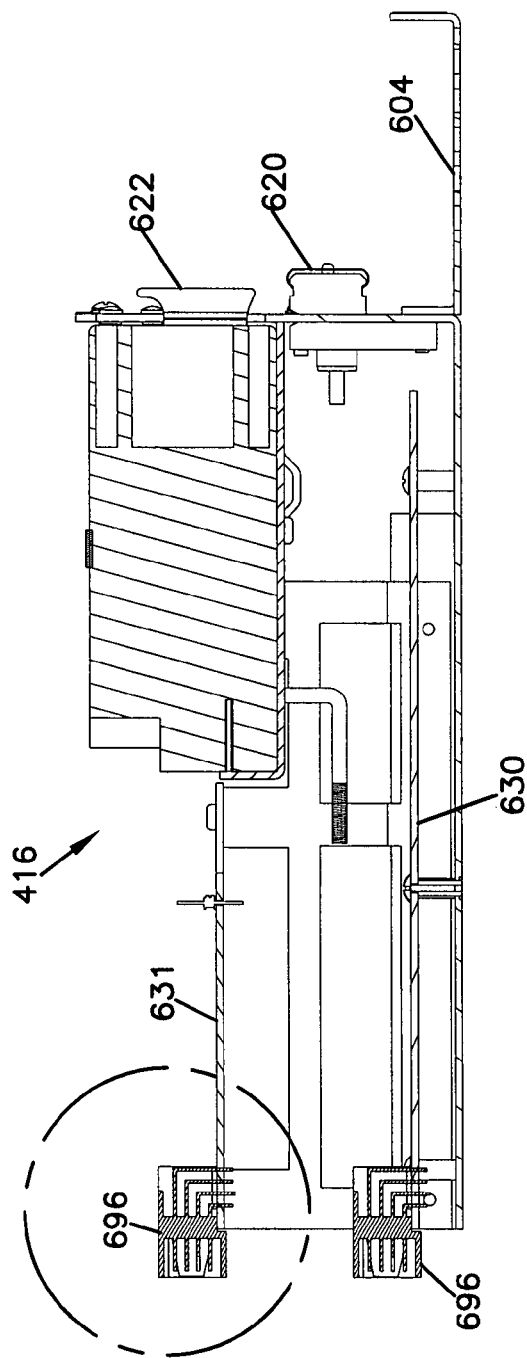
FIG. 37 is a cross-sectional view of the first circuit module of FIG. 31, taken along lines 37-37 of FIG. 35.
Figure 34:
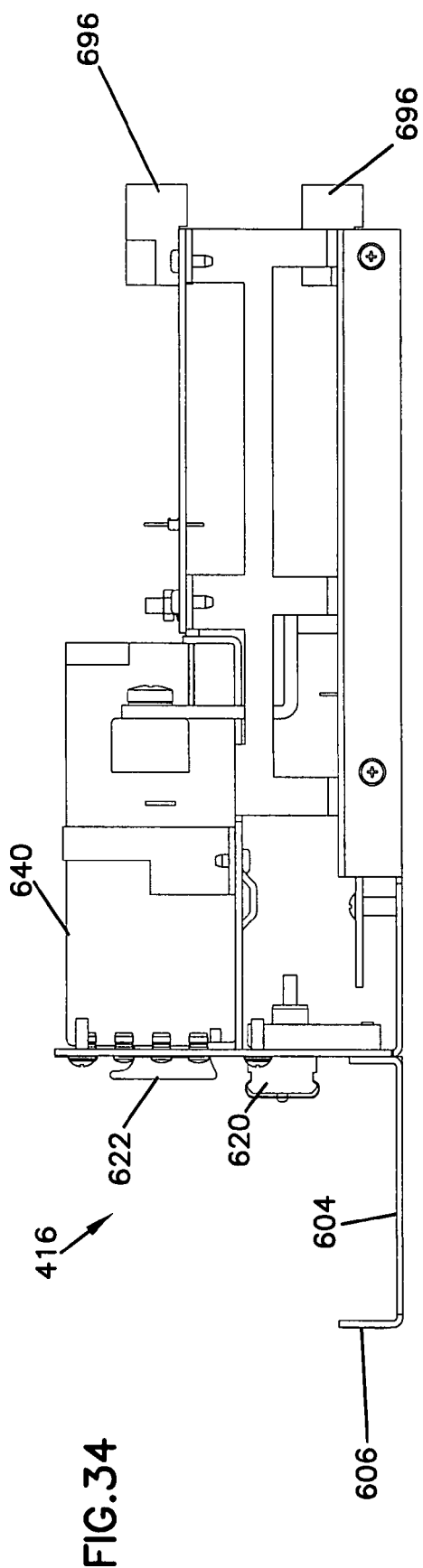
FIG. 34 is a side view of the first circuit module of FIG. 31.
Figure 35:
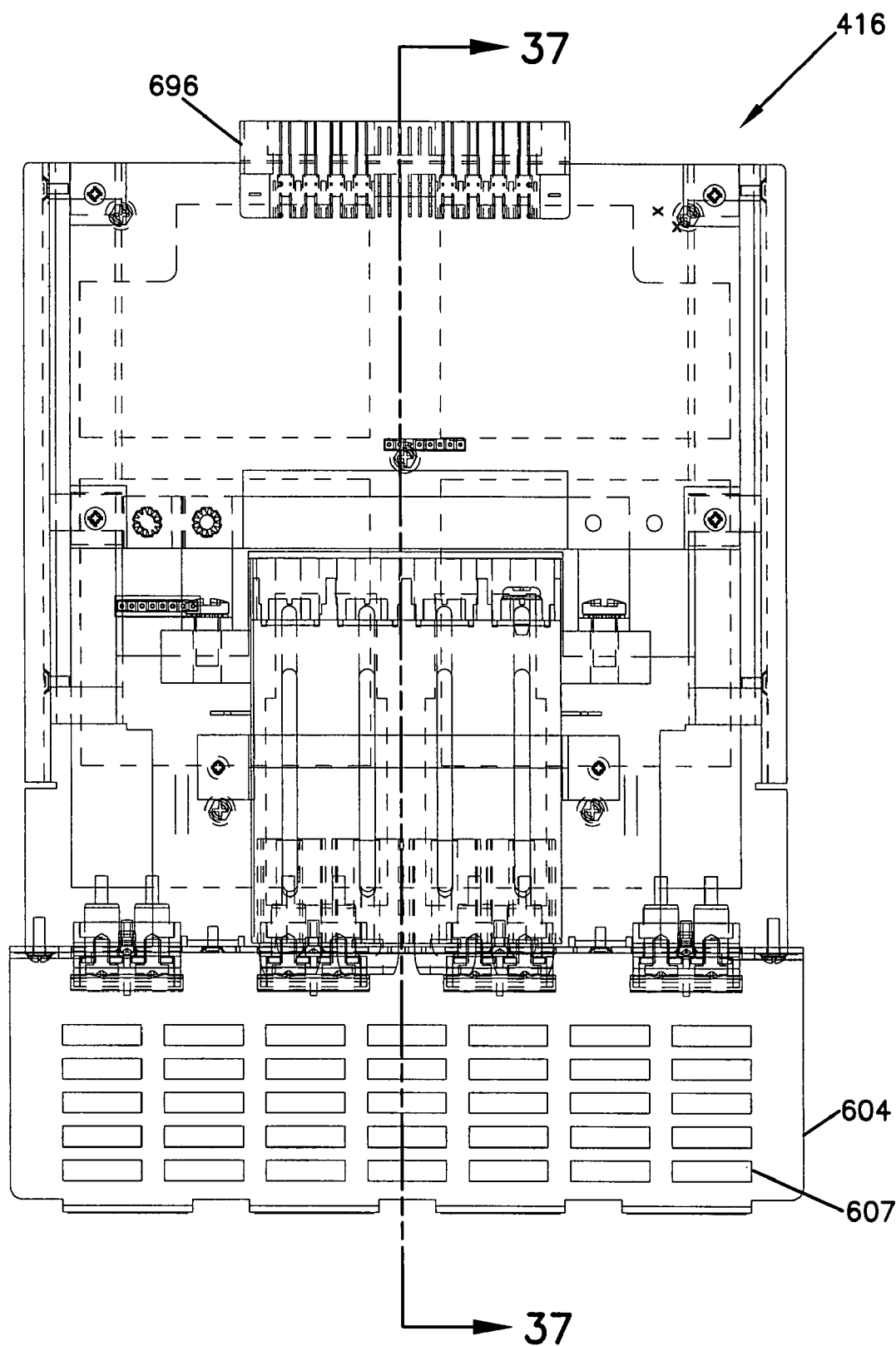
FIG. 35 is a top view of the first circuit module of FIG. 31.
Figure 36:
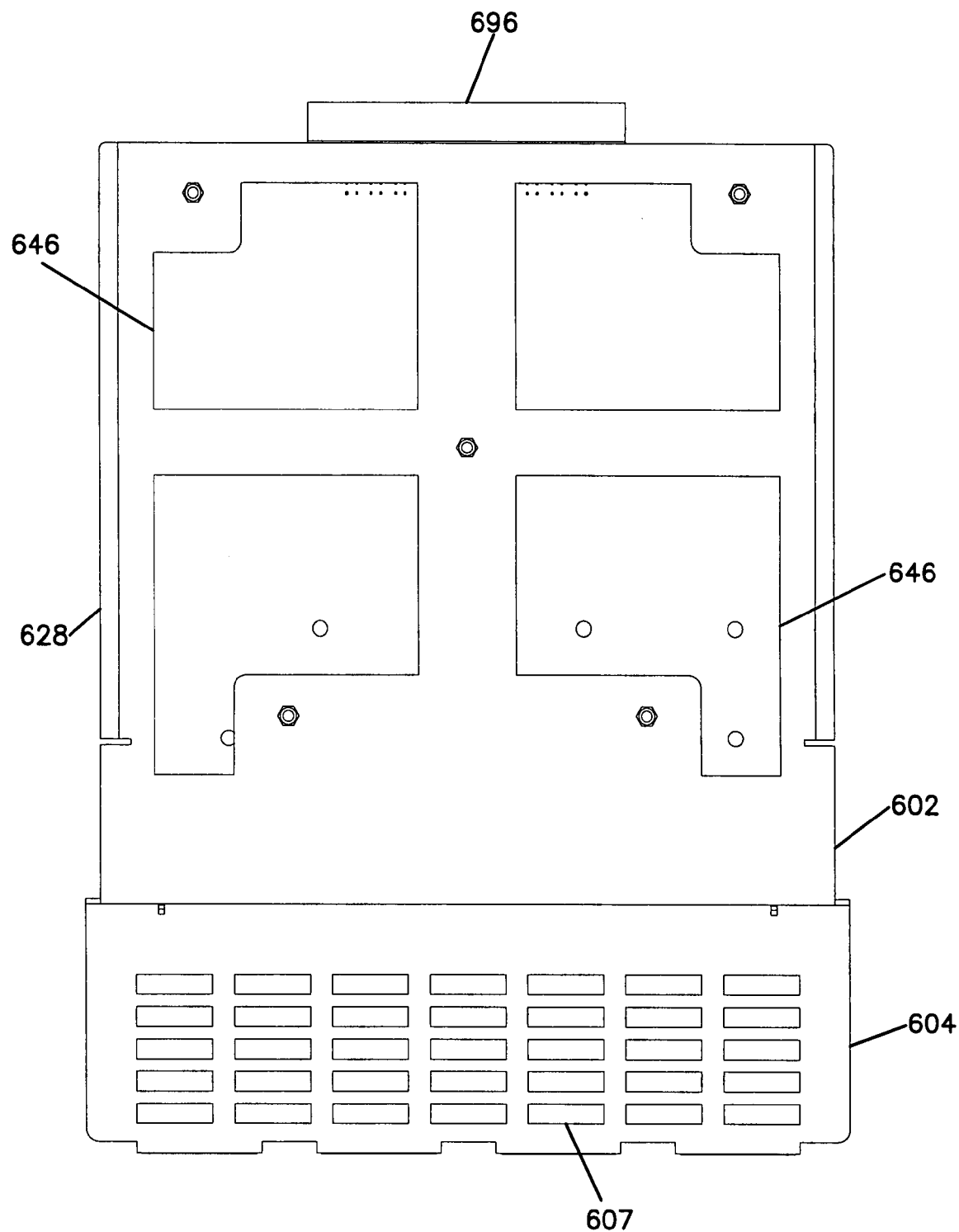
FIG. 36 is a bottom view of the first circuit module of FIG. 31.

Referring now to FIGS. 29 and 30, a further embodiment of a panel 510 is shown. Panel 510 includes the same chassis 430 as for panel 410, and four second modules 418, two on each side. Panel 510 also is shown including baffle plate 480. Baffle plate 480 also includes a front lip 482 positioned in an upward direction relative to a remainder of baffle plate 480. Front lip 482 and the rest of baffle plate 480 can also function as a cable tray for holding cables extending to and from panel 510, or for cables extending between equipment on either side of panel 510.

Referring now to FIGS. 31-39, first module 416 is shown in greater detail. Module 416 includes a frame 600 including a base 602, and a front tray 604 with front lips 606. Front tray 604 includes perforations 607 for use with cable ties. A vertical support 608 extends up from base 602 and defines a plurality of openings 610, 612 for output terminal units 620, and fuses 622, respectively. Base 602 also includes sides 626 and longitudinal rails 628. Two printed circuit boards 630, 631 connect between module connectors 696 and the circuit elements including output terminal units 620 and fuses 622. Fuse holder or block 640 with fuses 622 is held in place by a support tray 641 and a strap 642. Various openings 646 are provided in base 602 and tray 641 to assist with ventilation.

Referring now to FIGS. 40-48, second module 418 includes a frame 700 including a base 702, and a front tray 704 with front lips 706. Similar perforations 707 are provided for use as cable ties in front tray 704. A vertical support 708 defines a plurality of openings 710, 712 for output terminal units 720 and fuses 722 respectively. Frame 700 includes sides 726, and longitudinal rails 728. A printed circuit board 730 connects between module connector 696 and the circuit elements including output terminal units 720 and fuses 722. Various openings 746 are provided in base 702 to assist with ventilation.

Figure 38:
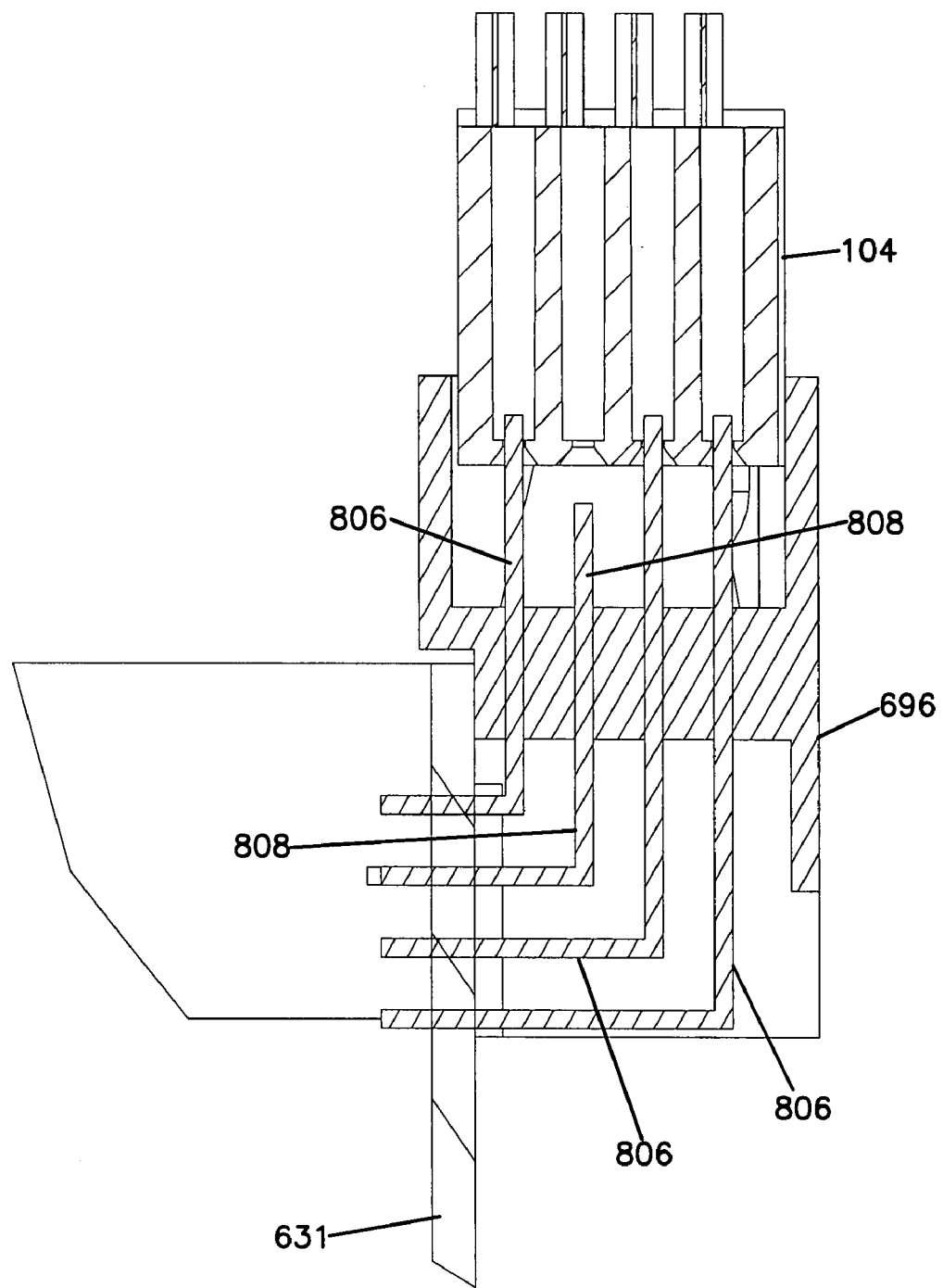
FIG. 38 is an enlarged view of a portion of the first circuit module of FIG. 37, shown partially connected to a backplane connector.
Figure 39:
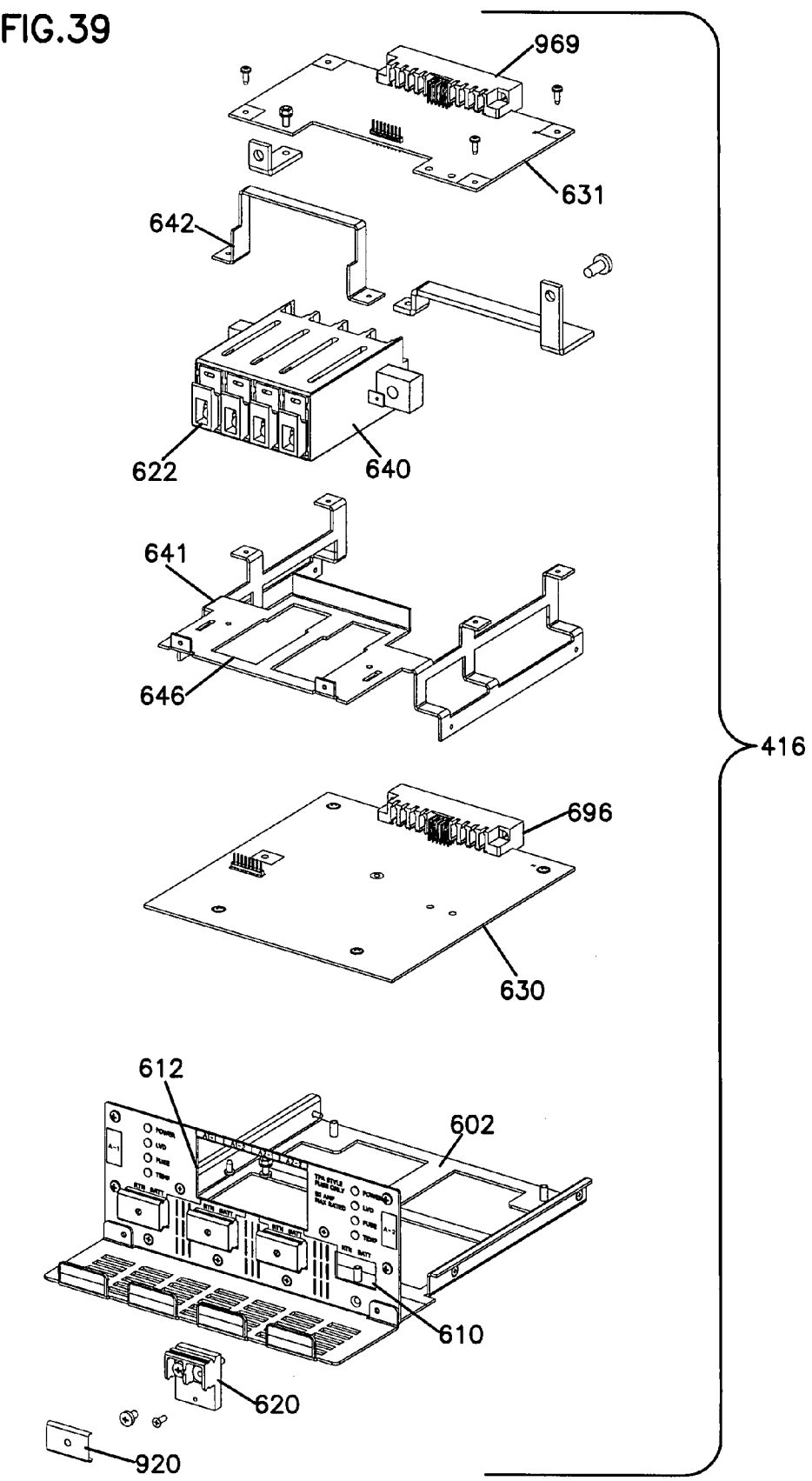
FIG. 39 is an exploded front perspective view of the first circuit module of FIG. 31.
Figure 40:
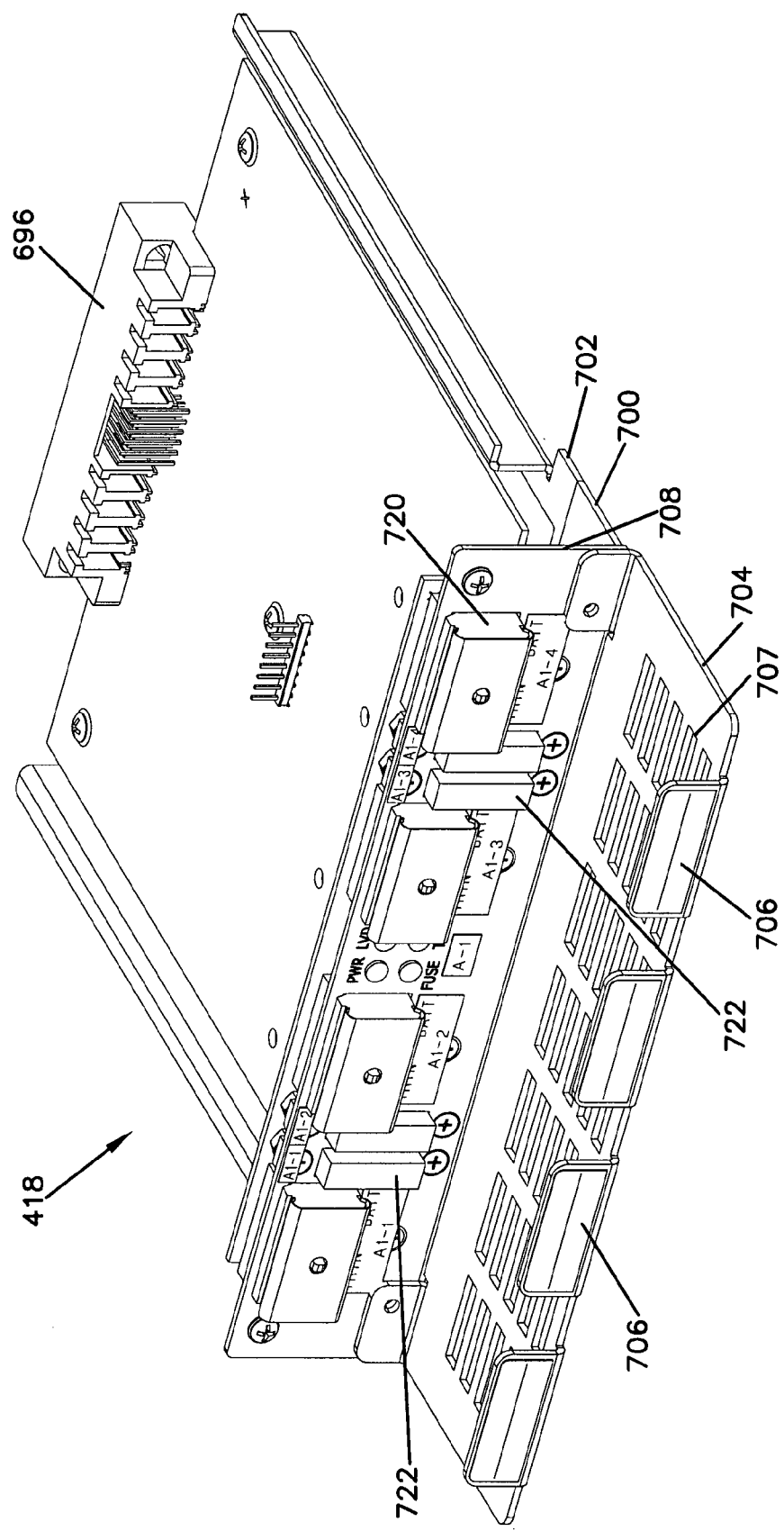
FIG. 40 is a front perspective view of a second circuit module of the power distribution panel of FIG. 21.
Figure 41:
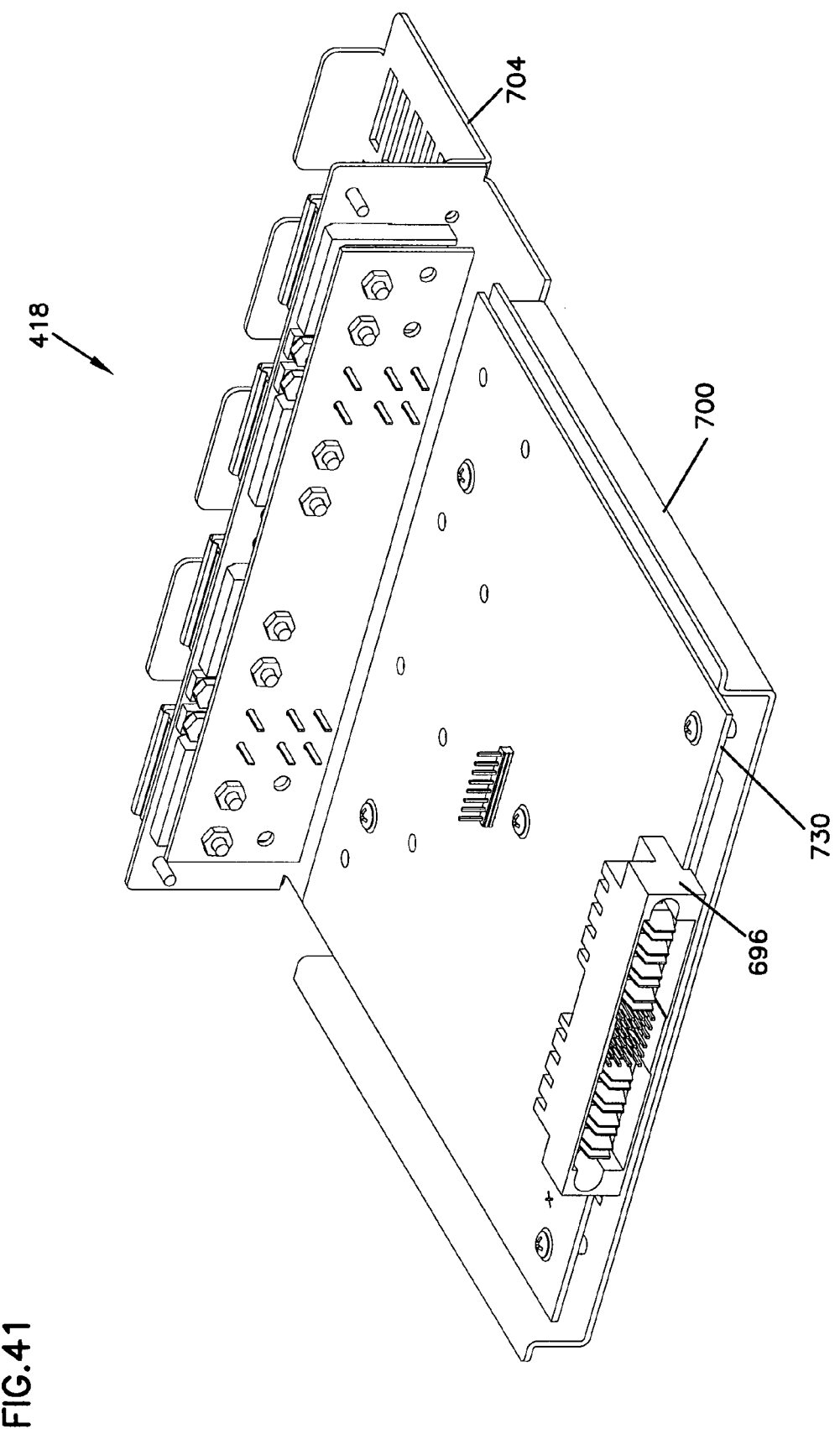
FIG. 41 is a rear perspective view of the second circuit module of FIG. 40.
Figure 42:
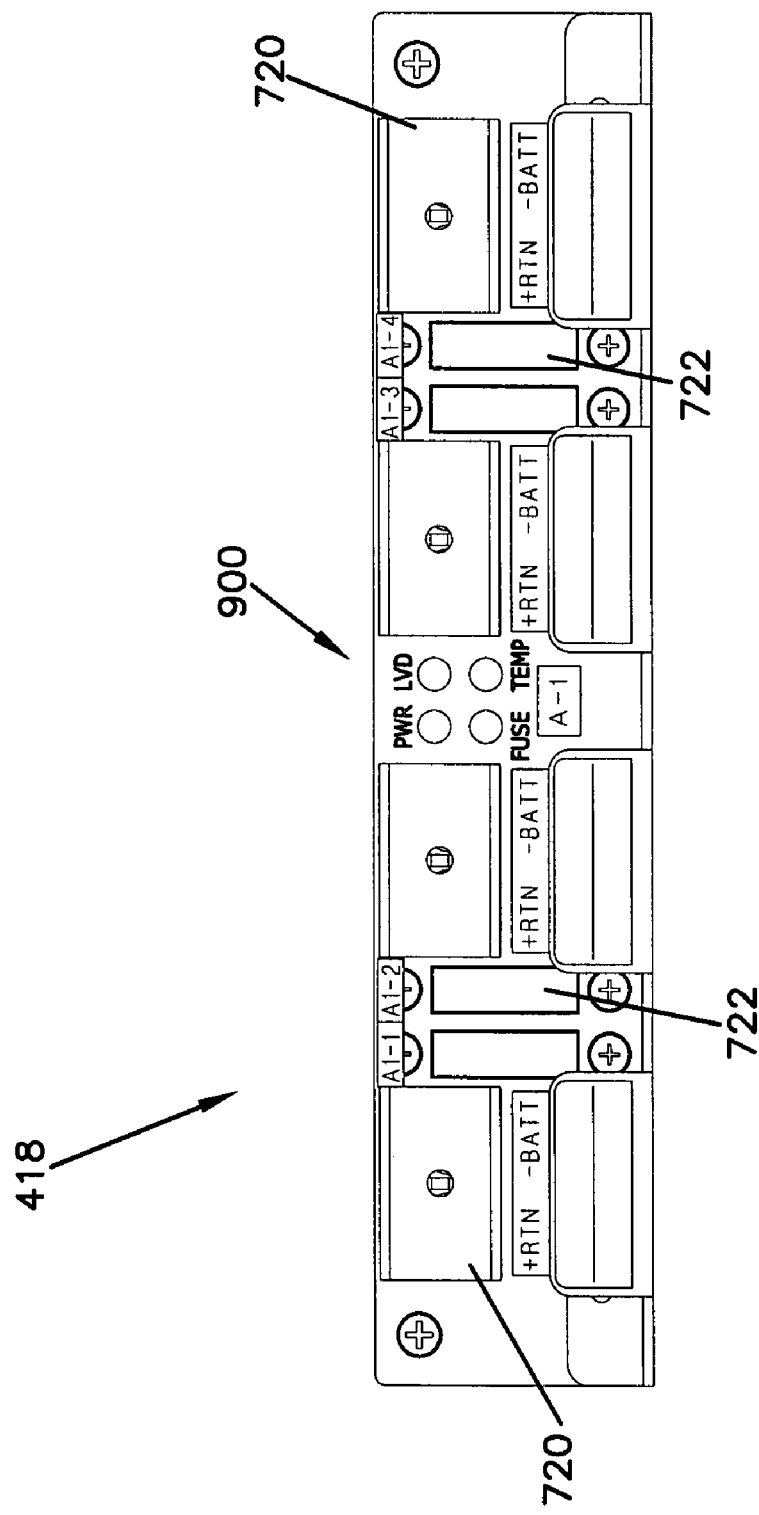
FIG. 42 is a front view of the second circuit module of FIG. 40.
Figure 46:
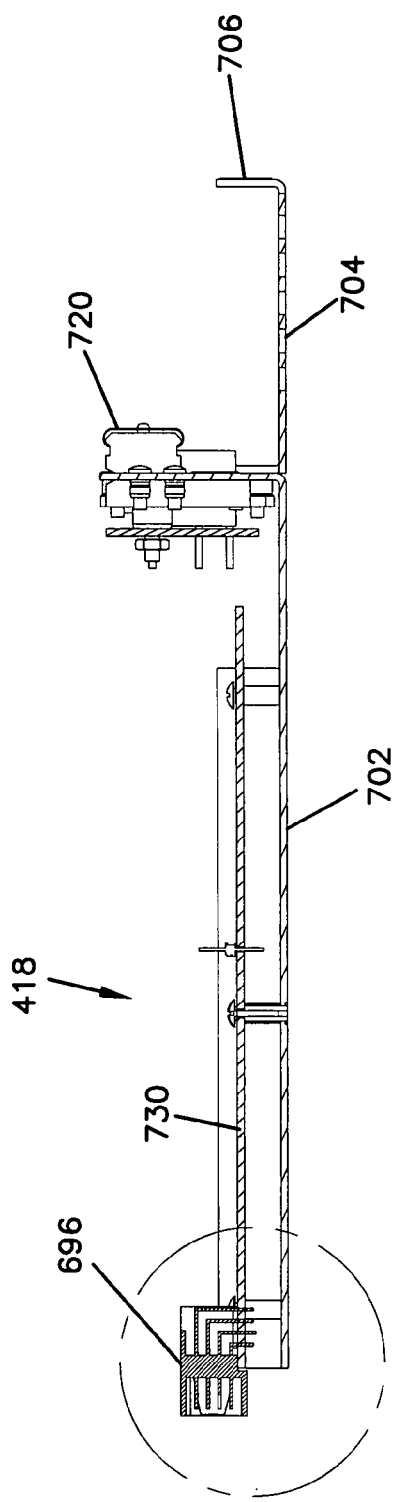
FIG. 46 is a cross-sectional side view of the second circuit module of FIG. 40, taken along lines 46-46 of FIG. 44.
Figure 43:
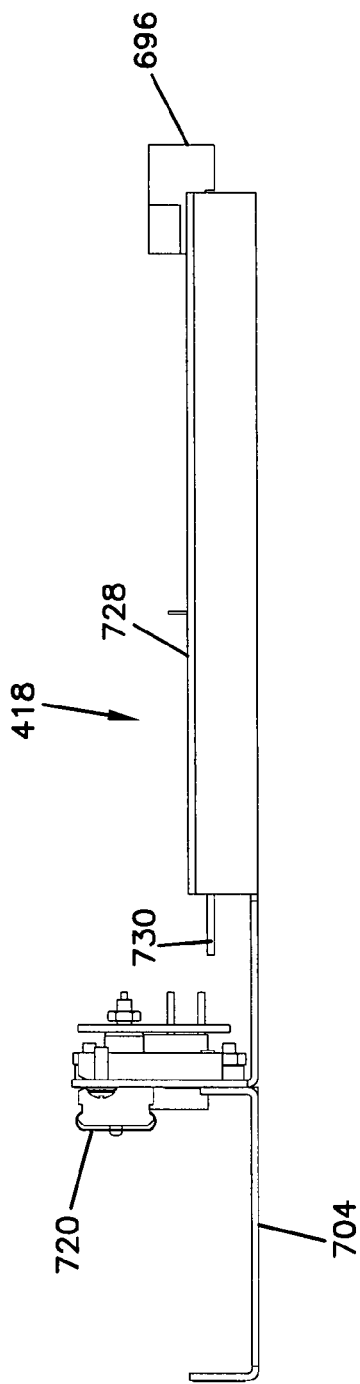
FIG. 43 is a side view of the second circuit module of FIG. 40.
Figure 44:
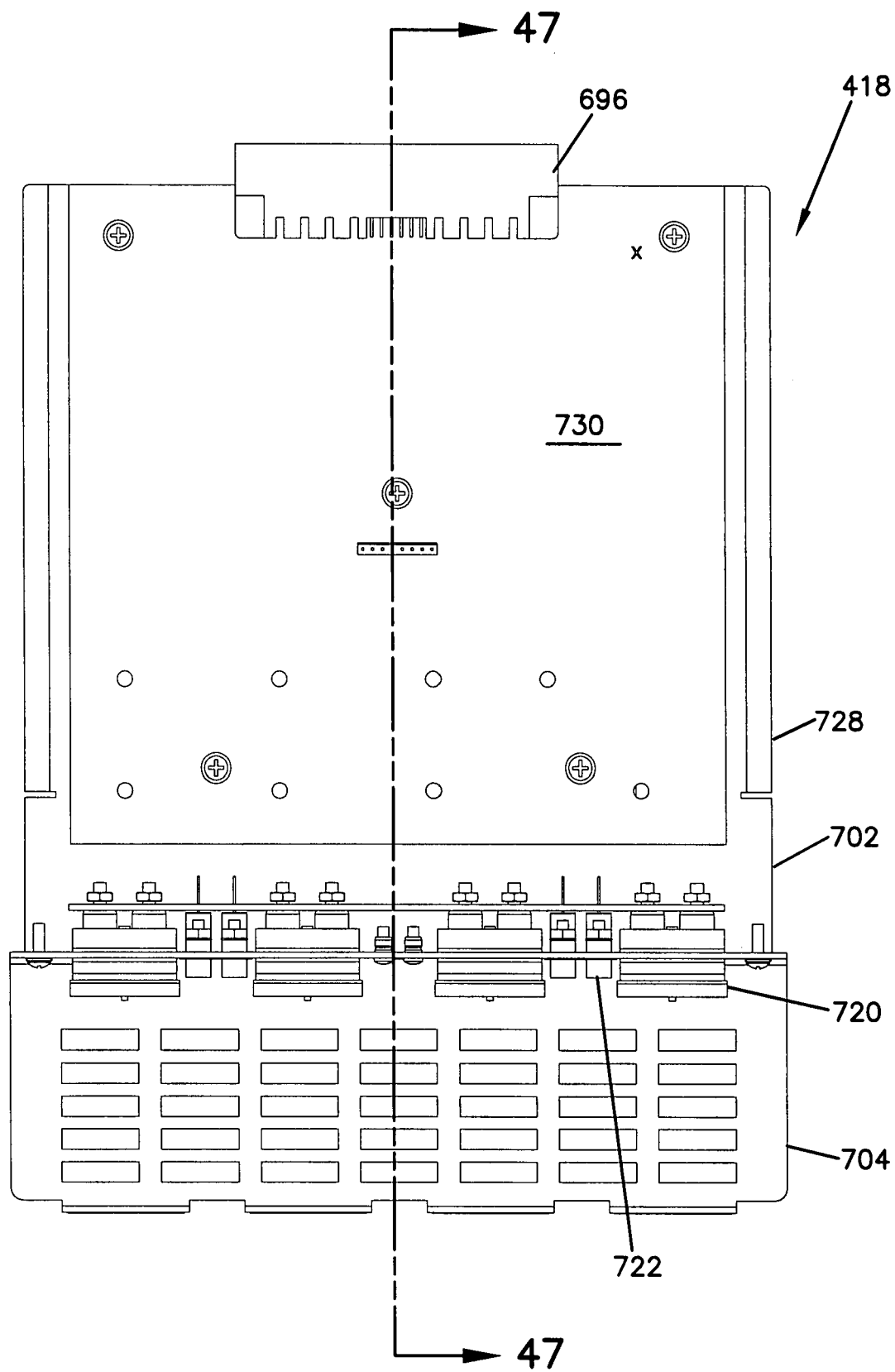
FIG. 44 is a top view of the second circuit module of FIG. 40.
Figure 45:
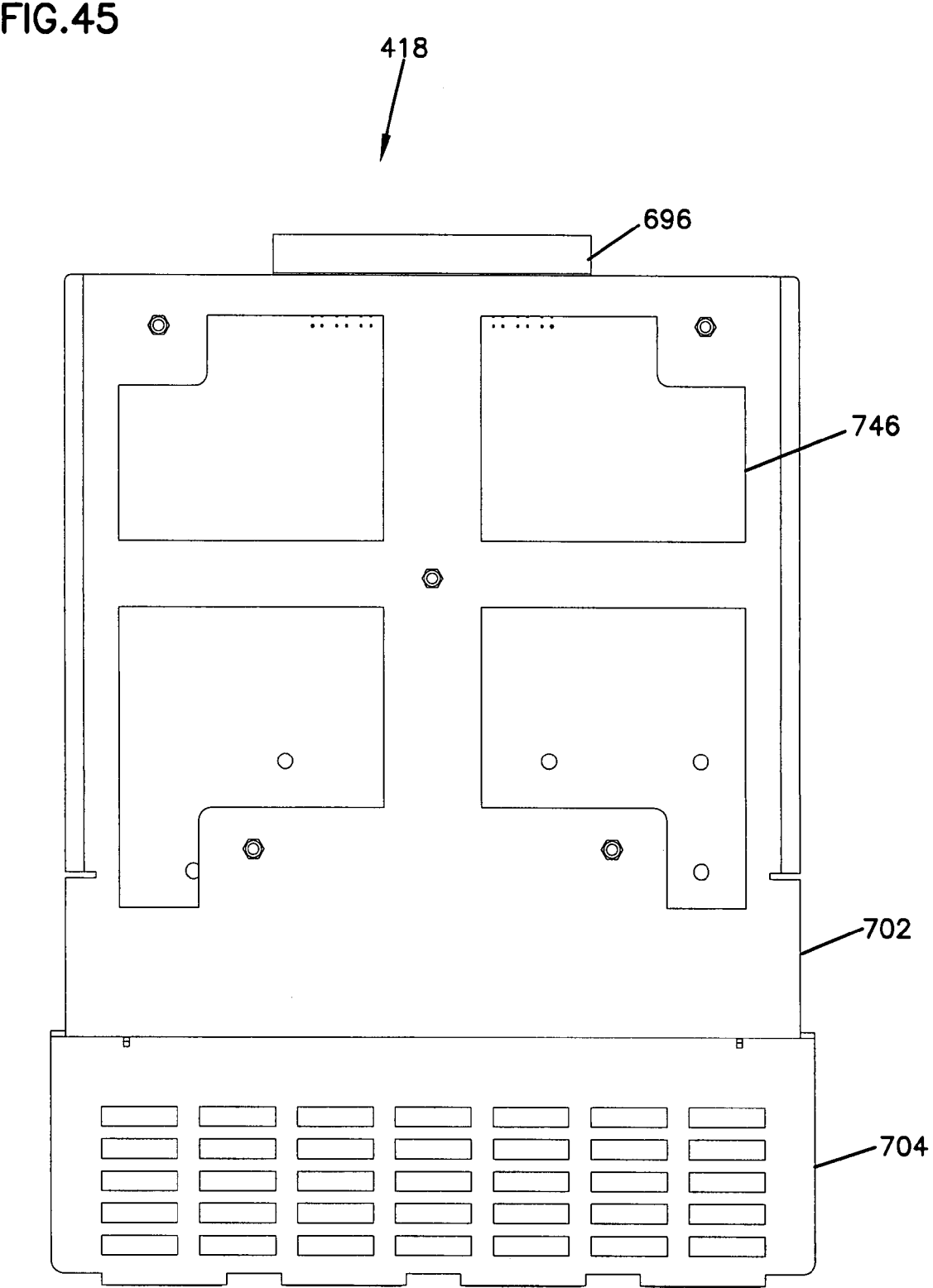
FIG. 45 is a bottom view of the second circuit module of FIG. 40.
Figure 47:
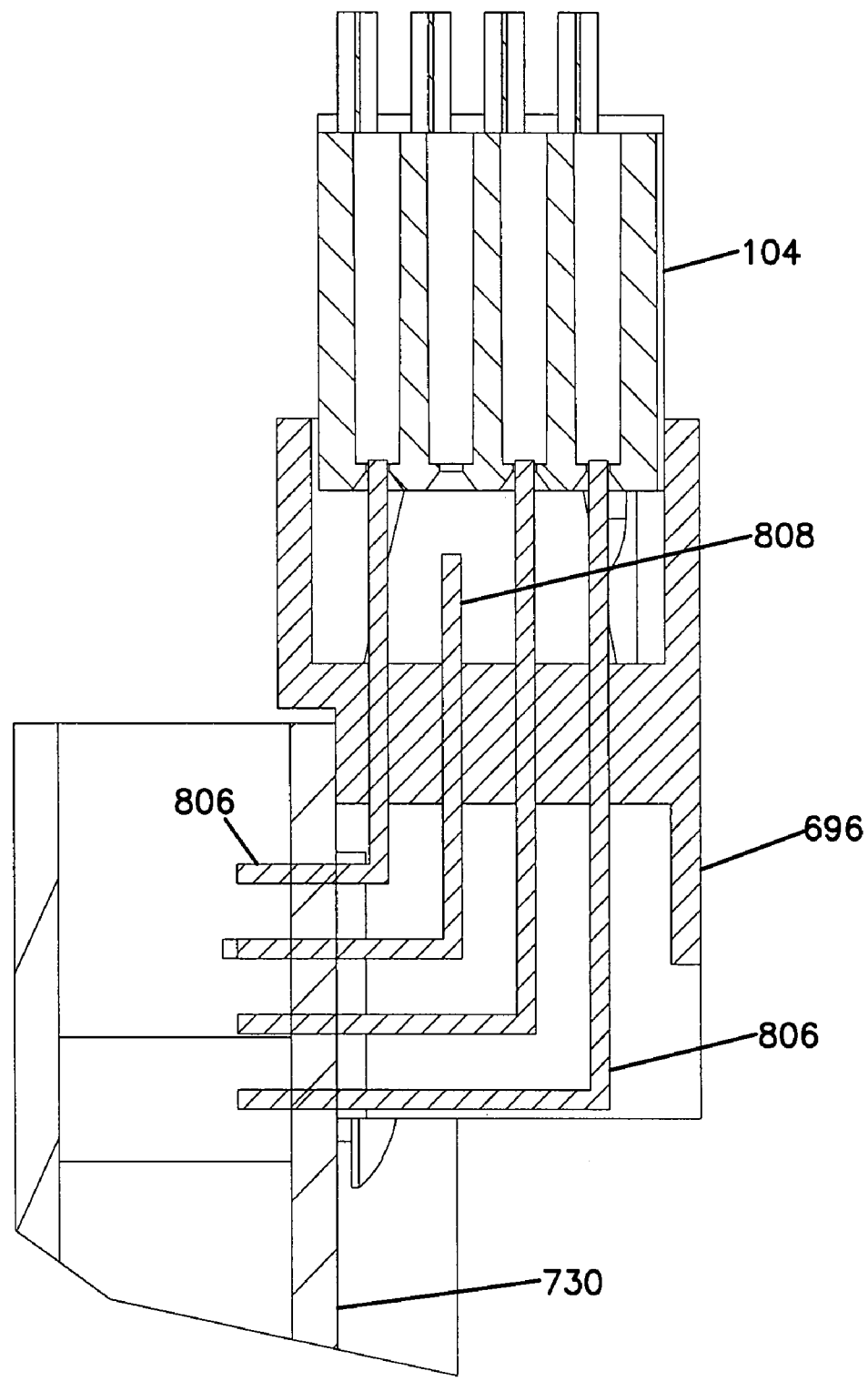
FIG. 47 is an enlarged view of a portion of the second circuit module of FIG. 46, shown partially connected to a backplane connector.
Figure 48:
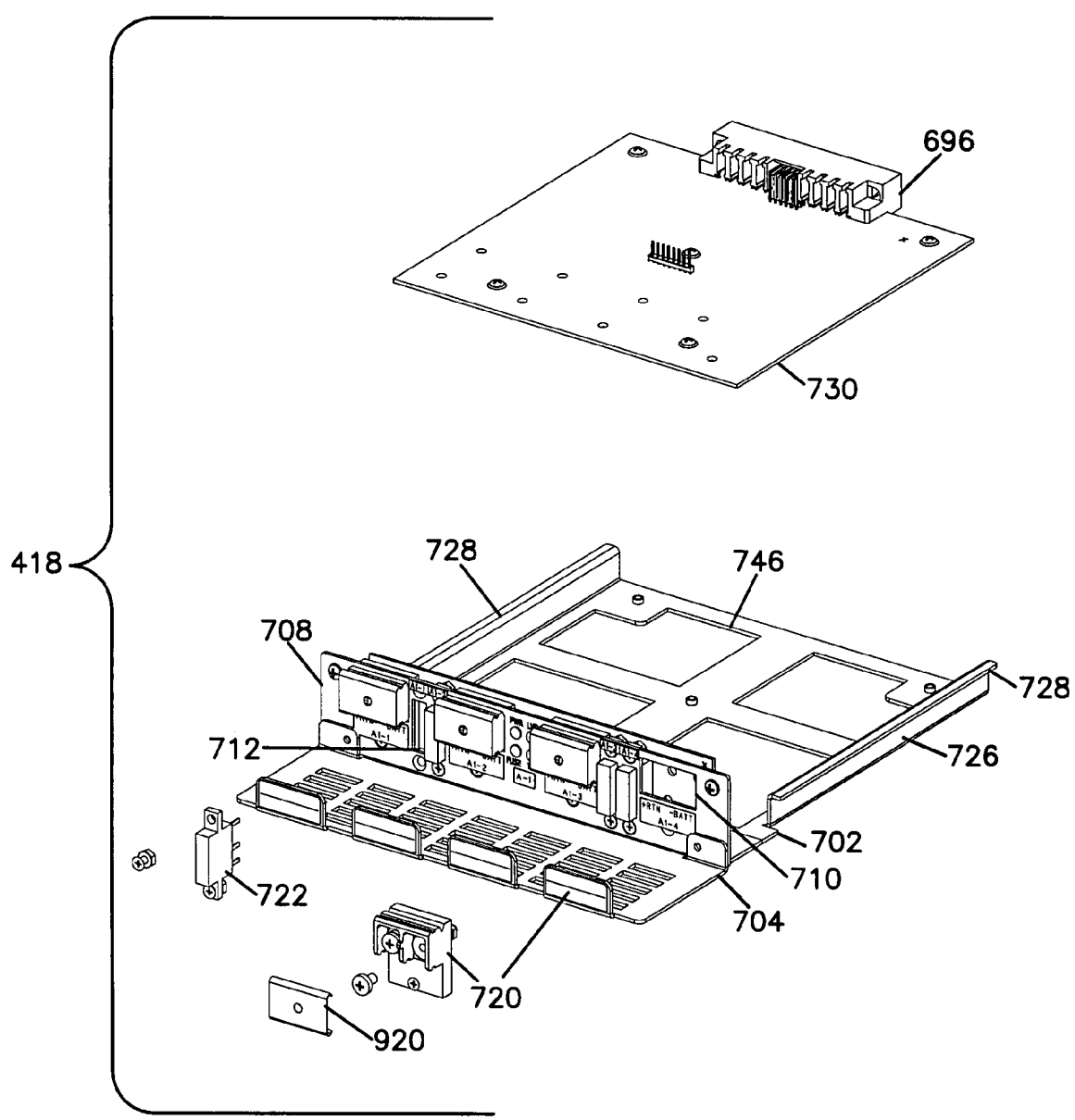
FIG. 48 is an exploded perspective view of the second circuit module of FIG. 40.
Figure 49:
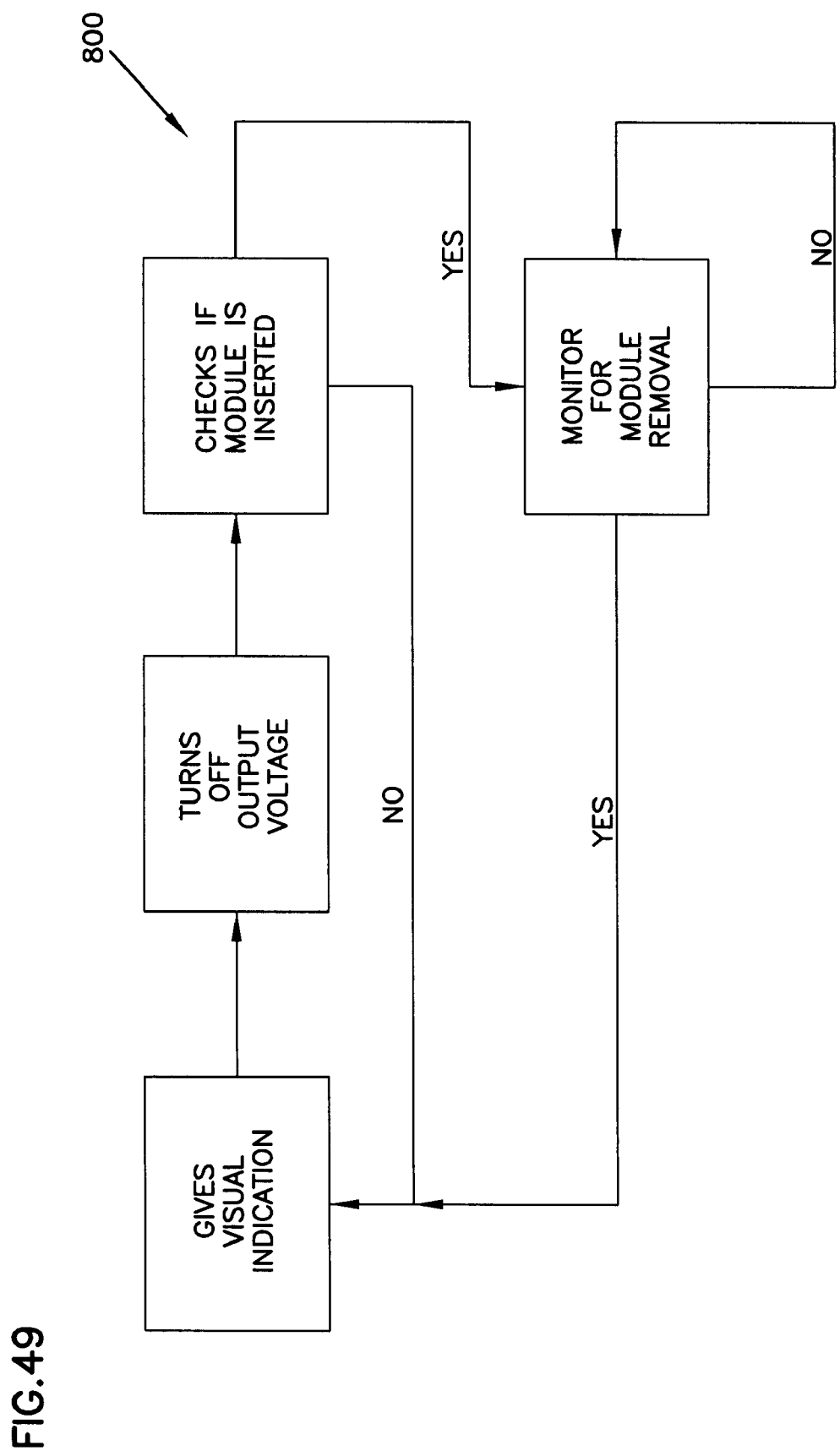
FIG. 49 is a flow chart relating to the voltage disconnect monitor.

Referring now to FIGS. 38, 47, and 49, a voltage disconnect feature is illustrated. One issue that can arise with removing of a module during operation is that arcing may occur between the connectors 696 of the modules, and the connectors 104 of the backplane. A voltage disconnect system 800 is provided to turn off the power to the module prior to removal of the module in order to prevent arcing. A selected pin 808 among pins 806 of connector 696 is provided with a shortened length. The shortened pin 808 will disengage first before the power connections disengage. This will provide an interrupt signal that will be received by a device, such as a microcontroller or a similar device on the module, to activate a voltage disconnect mechanism which turns off the current to the load. This will prevent arcing on the connectors and prevent damage from occurring. Furthermore, if the module is not completely inserted, the short pin 808 will prevent the voltage disconnect mechanism from activating and keep the output current turned off until the module is fully inserted. A visual indication will be displayed if the module is not fully inserted. FIG. 49 illustrates an example flow chart illustrating the voltage disconnect feature.

Each module 416, 418 includes various visual indicators to indicate system conditions. For example, there are provided visual indications for power, low voltage, blown fuse, and excess temperature through visual indicators 900.

Power input covers 910, and power output covers 920 can be provided if desired.

Figure 50:
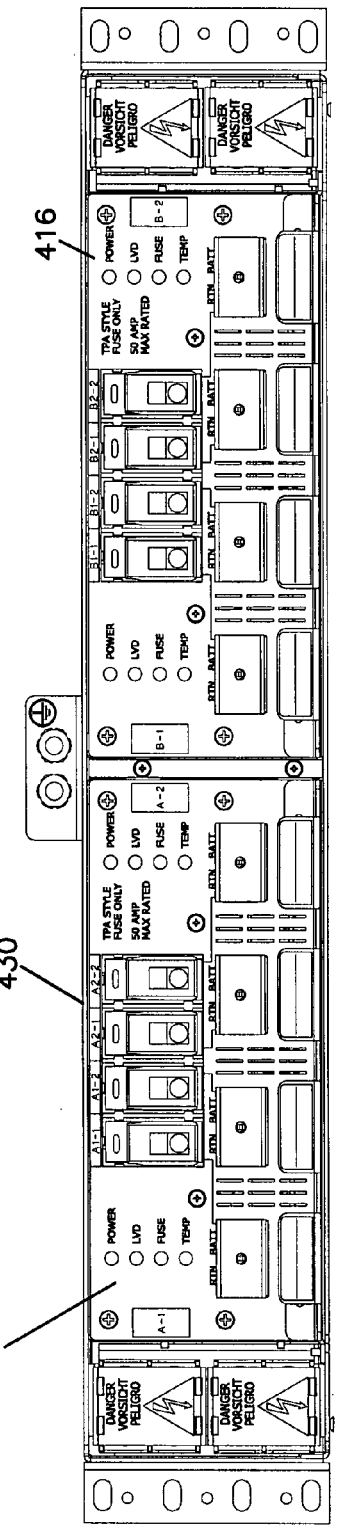
FIG. 50 shows greater detail of a front of a power distribution panel including two of the first circuit modules of FIG. 31, including the label configurations.
Figure 51:
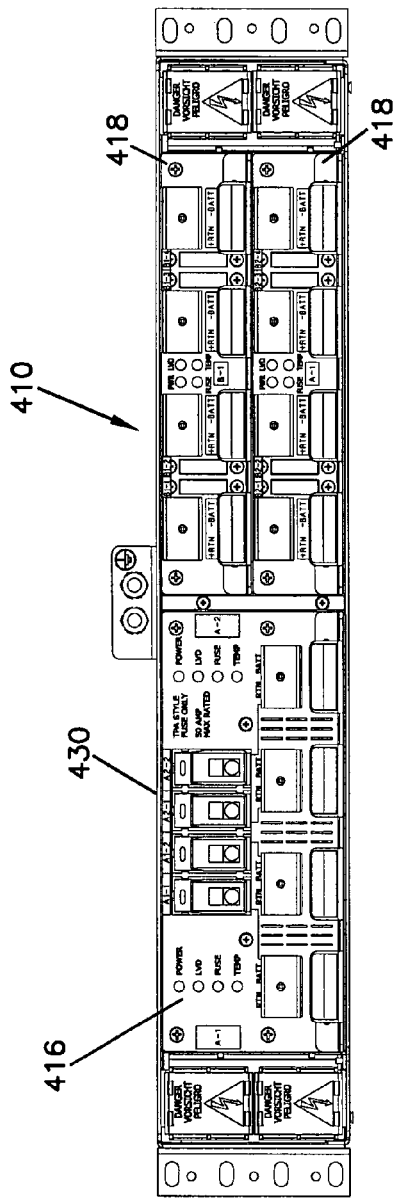
FIG. 51 shows greater detail of a front of the power distribution panel of FIG. 21, including the label configurations.
Figure 52:
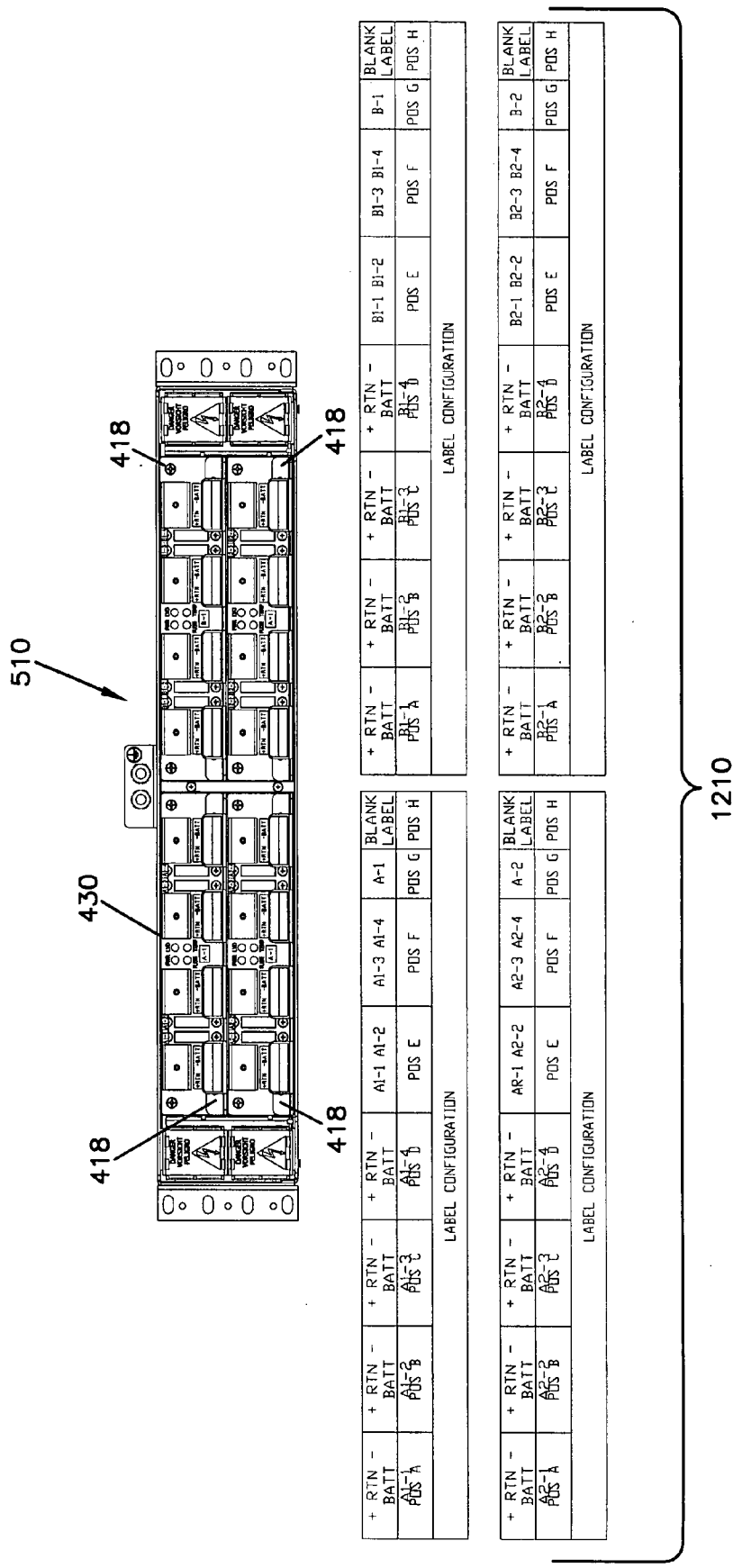
FIG. 52 shows in greater detail a front of another power distribution panel including four of the second circuit modules of FIG. 40, including the labeling configurations.

As shown in FIGS. 50-52, various arrangements for panels 410, 510, 1010 are shown using the same chassis 430. Labels 1200, 1210, 1220 can be used to label each module 416, 418 as needed for each arrangement. Labels 1200, 1210, 1220 can be adhesively attached to each module 416, 418 as needed.

We claim:

1. A modular power distribution system comprising:
   (a) a chassis including:
      (i) an open front;
      (ii) front power input connections;
   (b) a backplane including:
      (i) a plurality power inputs;
      (ii) a plurality of module connection locations;
   (c) a bus bar arrangement connecting the front power input connections of the chassis to the power inputs of the backplane;
   (d) a plurality of modules mounted in the chassis, each module mounted to one of the module connection locations, each module including:
      (i) a circuit protection device; and
      (ii) a power output connection.

2. The power distribution system of claim 1, wherein the chassis includes a top, a bottom, a rear, and two sides which enclose the backplane, and the bus bar arrangement, and further comprising brackets for mounting the chassis to an equipment rack.

3. The power distribution system of claim 2, wherein the bus bar arrangement includes a plurality of metal bus bars extending from the front power input connections located adjacent to the brackets to the power inputs of the backplane, wherein the power inputs of the backplane face toward the rear of the chassis.

4. The power distribution system of claim 3, wherein the bus bars define a Z shape.

5. The power distribution system of claim 3, wherein the bus bars contact the backplane in two locations.

6. The power distribution system of claim 2, wherein the top and the bottom of the chassis each include ventilation openings.

7. The power distribution system of claim 2, wherein the top of the chassis includes a ground connection located between the open front and the rear, and wherein the ground connection faces toward the same direction faced by the open front.

8. The power distribution system of claim 1, further comprising an alarm connector on the backplane, and an alarm card mounted in the chassis in the open front.

9. The power distribution system of claim 1, wherein each of the modules includes a power input connector matable with one of the module connection locations of the backplane, wherein the power input connector includes a plurality of pins, wherein one of the pins is shorter than a remainder of the pins.

10. The power distribution system of claim 9, wherein each of the modules includes a circuit board extending between the power input connector for connecting to the module connection locations of the backplane, and a frame which supports the circuit board, the circuit board connecting the power input connector, the circuit projection device and the power output connection of each module.

11. The power distribution system of claim 1, wherein each of the modules includes a front tray including an upwardly extending front lip.

12. The power distribution system of claim 1, wherein the circuit protection device of at least one of the modules includes a fuse accessible from a front of the module while the module is mounted in the chassis.

13. The power distribution system of claim 12, wherein the circuit protection device of at least one of the modules includes a GMT type fuse accessible from the front of the module while the module is mounted in the chassis.

14. The power distribution system of claim 12, wherein the circuit protection device of at least one of the modules includes a TPA type fuse accessible from the front of the module while the module is mounted in the chassis.

15. A chassis for a modular power distribution system comprising:
 (a) a chassis body including a top, a bottom, a rear, opposite outside panels and inside panels, and an open front;
 (b) front power input connections:
 (c) a backplane including;
  (i) a plurality of power inputs;
  (ii) a plurality of module connection locations;
 (d) a bus bar arrangement extending between the outside panels and inside panels, and extending between the backplane and the rear, wherein the bus bar arrangement connects the front power input connections to the power inputs of the backplane.

* * * * *

UNITED STATES PATENT AND TRADEMARK OFFICE
CERTIFICATE OF CORRECTION

| | | |
|---|---|---|
| PATENT NO. | : 7,440,262 B2 | Page 1 of 1 |
| APPLICATION NO. | : 11/710851 | |
| DATED | : October 21, 2008 | |
| INVENTOR(S) | : Coffey et al. | |

It is certified that error appears in the above-identified patent and that said Letters Patent is hereby corrected as shown below:

Col. 6, line 18, claim 1: "(i) a plurality power inputs;" should read --(i) a plurality of power inputs;--

Signed and Sealed this

Ninth Day of November, 2010

David J. Kappos
*Director of the United States Patent and Trademark Office*